United States Patent [19]

Ueno et al.

[11] Patent Number: 5,067,231
[45] Date of Patent: Nov. 26, 1991

[54] SYSTEM FOR PRESS-FITTING PARTS INTO WORKPIECE

[75] Inventors: Tsugio Ueno; Masato Sato; Yoshiaki Mori, all of Saitama, Japan

[73] Assignee: Honda Giken Kogyo Kabushiki Kaisha, Tokyo, Japan

[21] Appl. No.: 510,451

[22] Filed: Apr. 17, 1990

[30] Foreign Application Priority Data

| Apr. 17, 1989 | [JP] | Japan | 1-96759 |
| Apr. 17, 1989 | [JP] | Japan | 1-96760 |
| Apr. 17, 1989 | [JP] | Japan | 1-96761 |
| May 19, 1989 | [JP] | Japan | 1-127549 |
| Jun. 23, 1989 | [JP] | Japan | 1-161987 |

[51] Int. Cl.$^5$ .................................... B23Q 7/10
[52] U.S. Cl. ........................... 29/809; 29/252; 29/525
[58] Field of Search .................. 29/252, 251, 809, 816, 29/525

[56] References Cited

U.S. PATENT DOCUMENTS

| 2,906,012 | 9/1959 | Rothfuchs et al. | 29/252 |
| 3,810,293 | 5/1974 | Tobak et al. | 29/252 |
| 3,916,499 | 11/1975 | Frame et al. | 29/252 |
| 4,763,394 | 8/1988 | Decato et al. | 29/252 |

FOREIGN PATENT DOCUMENTS

| 49-22744 | 6/1974 | Japan . |
| 52-23112 | 6/1977 | Japan . |
| 60-228033 | 11/1985 | Japan . |
| 62-98621 | 6/1987 | Japan . |
| 1162995 | 9/1969 | United Kingdom . |

Primary Examiner—Irene Cuda

[57] ABSTRACT

Parts such as bearings are press-fitted into a workpiece by an automatic system which includes a positioning device for positioning a workpiece, and a pressing device for press-fitting a part into the workpiece which is positioned by the positioning device. The positioning device includes a jig base having a stationary reference surface, a support table movable toward and away from the stationary reference surface, and a pusher unit for pushing the support table to create a gap between an end surface of the workpiece and the stationary reference surface when the workpiece is placed on the support table. The pressing device includes a presser unit including a presser rod for holding the part thereon, the presser unit being movable toward and away from the support table, and an actuator for pressing the end surface of the workpiece against the stationary reference surface to position the workpiece before the part is press-fitted into the workpiece by the presser rod.

26 Claims, 21 Drawing Sheets

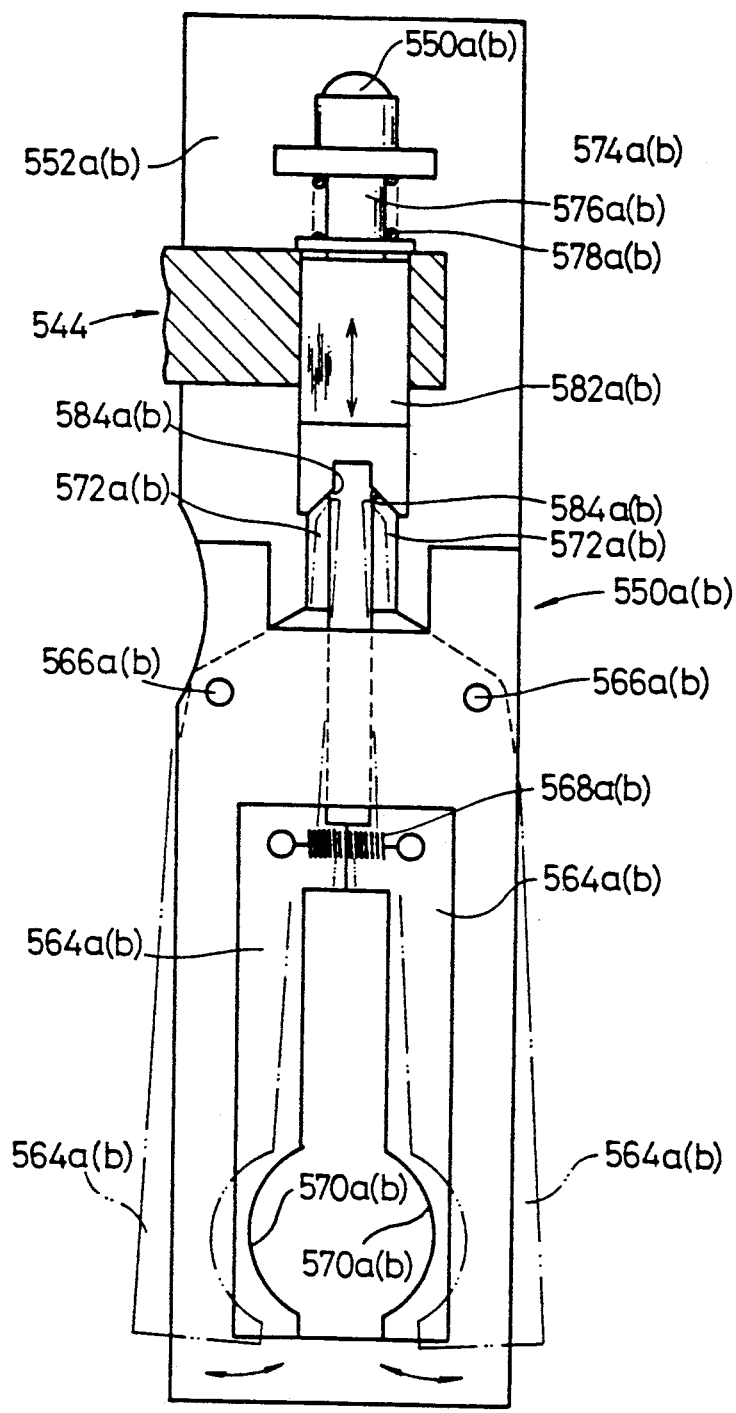

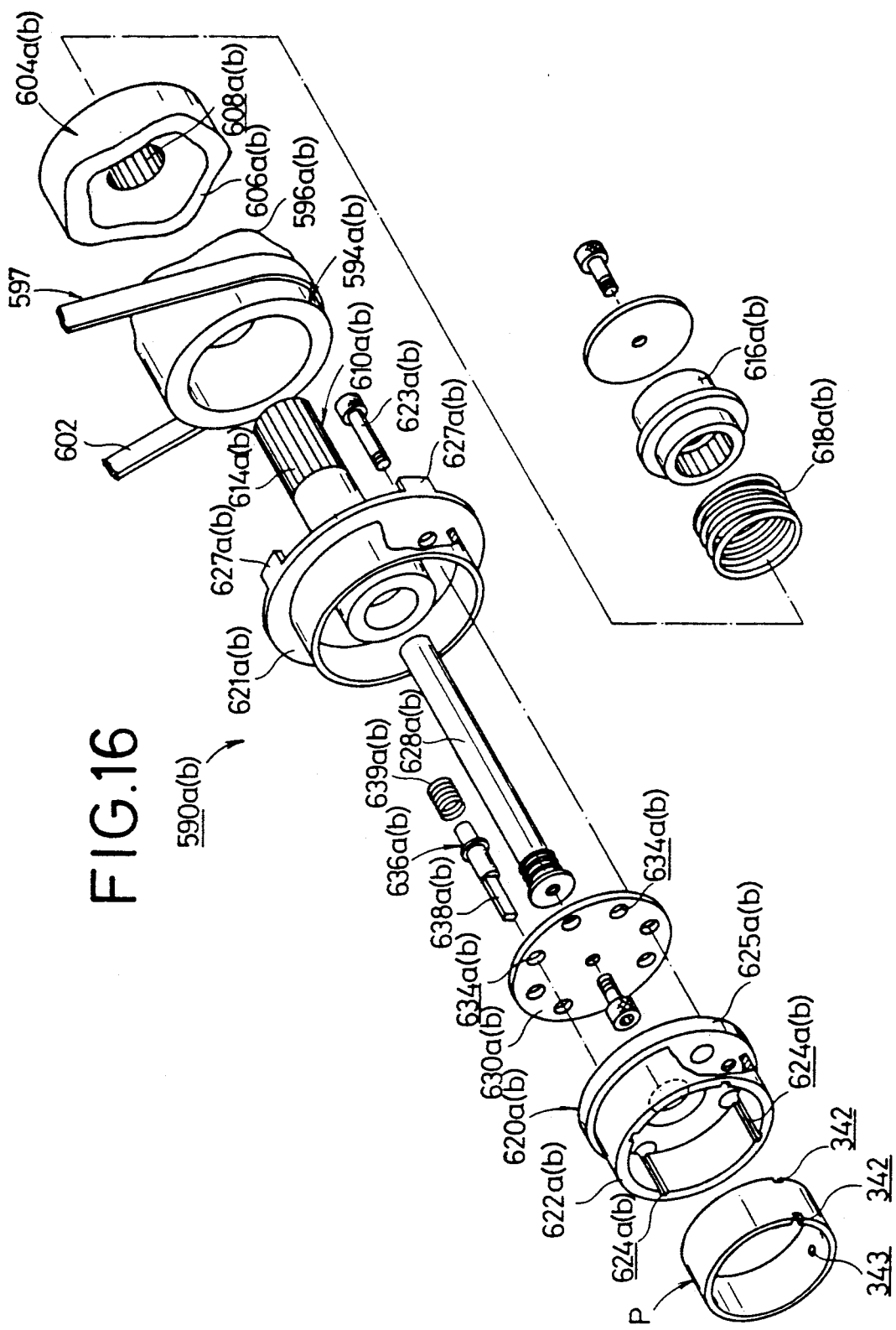

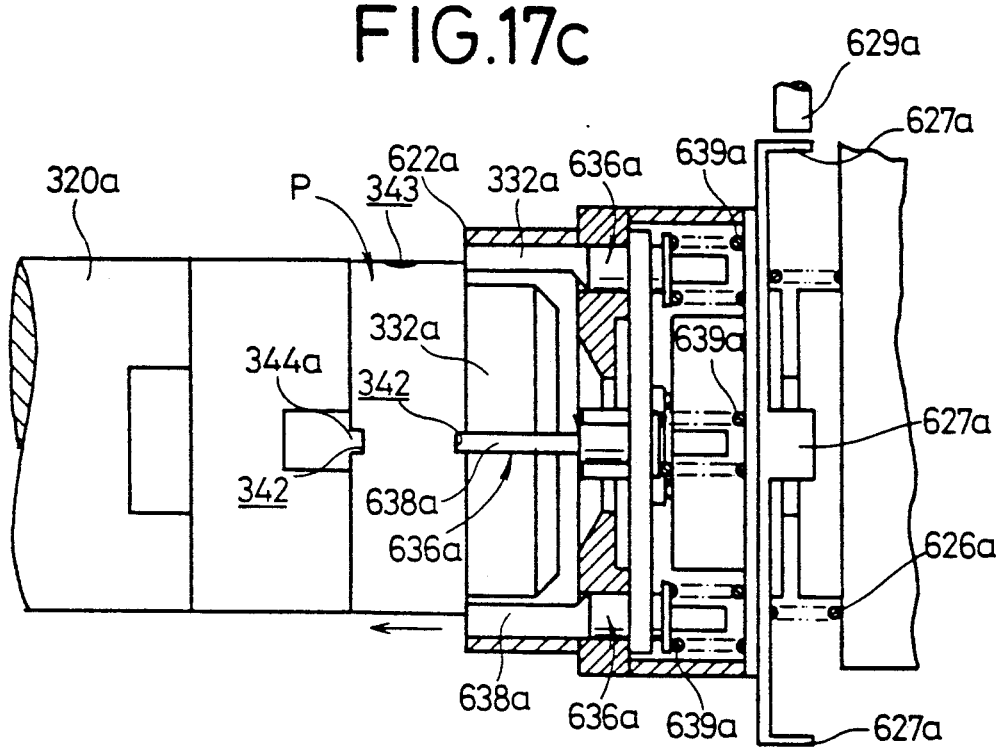

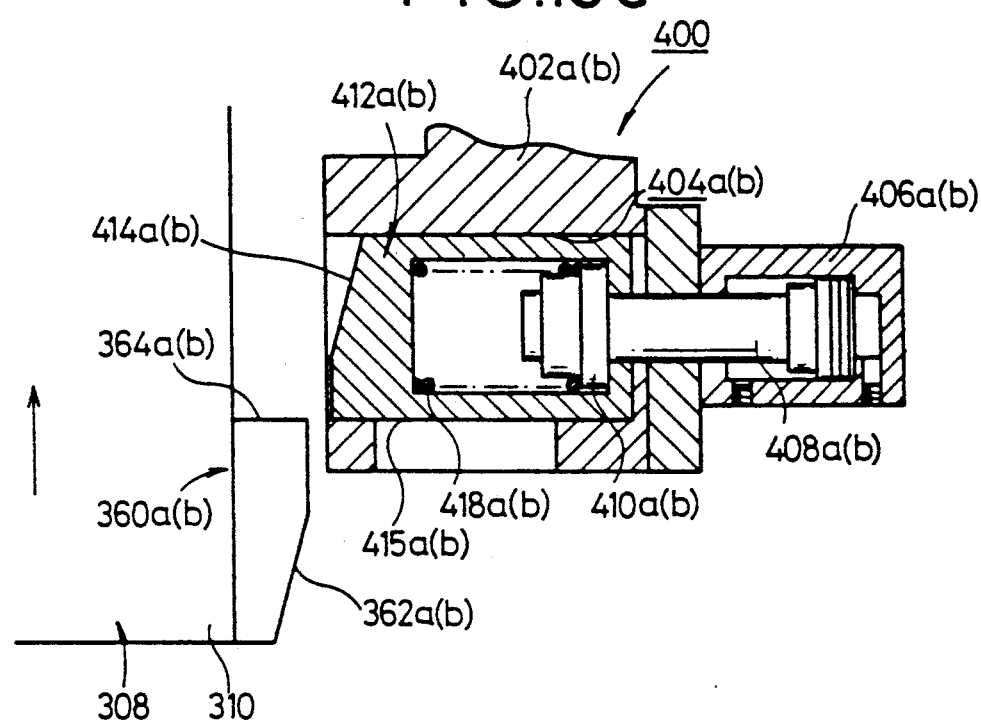

SYSTEM FOR PRESS-FITTING PARTS INTO WORKPIECE

BACKGROUND OF THE INVENTION

The present invention relates to a system for and a method of press-fitting parts such as bearings into other components or workpieces such as casings.

Various mechanical parts such as bearings, bushings, or the like are press-fitted into other components or workpieces such as casings. In many applications, a plurality of parts are press-fitted into a single casing, and there is a demand for the mass production of such casings with press-fitted parts. Manual procedures for press-fitting parts into casings are quite inefficient, and cannot be relied upon in mass production processes. Therefore, automatic apparatus for press-fitting parts into other workpieces have been desired and actually developed to meet the demand.

Various automatic press-fitting apparatus have been proposed. One technical achievement of such an automatic press-fitting arrangement is disclosed in Japanese Patent Publication No. 49-22744, for example. The disclosed apparatus includes a frame having a stationary reference surface, a pallet for supporting a casing, the pallet being movable toward and away from the frame, and a pair of presser rods for press-fitting a pair of bushings into the casing from its opposite ends, the presser rods being movable toward and away from each other.

In operation, a casing is first placed on the pallet, and then one of the presser rods is moved toward the casing and press-fits a bushing, held on the end of the presser rod, into a hole defined in the casing. The other presser rod is also moved to cause its shoulder to press the casing, thereby pushing the pallet toward the frame until the end face of the pallet is held against the stationary reference surface. Then, the other presser rod is displaced toward the casing to press-fit a bushing, held on this presser rod, into the casing.

After one of the bushings has been press-fitted into the casing by one of the presser rods, the pallet is held against the stationary reference surface. Therefore, the casing is not positioned directly by the stationary reference surface. If the casing is not properly positioned and the presser rod is not aligned with the hole in the casing, then the bushing may be skewed with respect to the casing and press-fitted into the casing by the presser rod.

Japanese Patent Publication No. 52-23112 discloses an automatic press-fitting apparatus capable of simultaneously press-fitting two parts into a workpiece. The disclosed apparatus has a pair of presser units mounted by joints on the piston rod extending from a single cylinder, the presser units holding respective parts through chucks. When the cylinder is actuated, the parts supported by the presser units are simultaneously press-fitted into the workpiece.

When the parts are press-fitted into the workpiece, it is necessary to exert relatively large forces on the parts. In view of this, the presser units are moved at a considerably low speed. The presser units are also moved at a low speed when they are displaced from a retracted position to a position where the parts start to be press-fitted by the presser units. Therefore, a relatively long period of time is required to move the presser units before and after the parts are press-fitted into the workpiece. Consequently, the entire process of press-fitting the parts cannot be performed efficiently.

Moreover, since the two parts are simultaneously press-fitted into the workpiece by the single cylinder, the cylinder is necessarily large in capacity and hence size because of the relatively large force needed to press-fit each of the parts into the workpiece. At the time the two parts are simultaneously press-fitted into the workpiece, the workpiece is subjected to an undue load, and tends to be elastically deformed or otherwise damaged.

While the parts are being press-fitted into the workpiece in response to the operation of the cylinder, the presser units undergo reactive forces from the parts being press-fitted. The greater the forces applied to press-fit the parts, the greater the reactive forces acting on the presser units. The reactive forces may be too large to properly and reliably press-fit the parts into the workpiece. If the cylinder is increased in its capacity for reliable operation, then it does not operate efficiently and the entire apparatus is increased in size.

In cases where the parts to be press-fitted are bushings or the like, they have oil holes for passage of oil. When these parts are press-fitted into a workpiece, the oil holes of the parts must be held in exact registry with corresponding oil holes defined in the workpiece. There have been proposed various devices for automatically phasing the parts with the workpiece. One of such automatic phasing machines is disclosed in Japanese Laid-Open Utility Model Publication No. 62-98621.

According to the disclosed arrangement, a part is positioned and held on a presser head by fingers which are spread by a spherical body engaging a resilient member. However the part tends to turn into a different angular position when the presser head is moved into a position where the part is to be press-fitted. At the time the part is press-fitted into a workpiece, the part is liable to turn due for example to the difference between local resistances to the press-fitting action. The part may be press-fitted into the workpiece while the oil hole in the part is being positioned out of registry with the oil hoe in the workpiece. Therefore, the efficiency of the process of press-fitting parts into workpieces remains low.

Japanese Laid-Open Patent Publication No. 60-228033 discloses a parts supply device for supplying different parts at spaced intervals to an automatic press-fitting apparatus of the type described above.

The disclosed parts supply device is positioned behind the automatic press-fitting apparatus. After parts have been fed to the presser rods of the automatic press-fitting apparatus, the automatic press-fitting apparatus is turned until the parts confront a workpiece. Then, the workpiece and the presser rods are displaced toward each other to press-fit the parts into the workpiece. The turning movement of the automatic press-fitting apparatus, however, makes the press-fitting procedure inefficient. If the parts supply device is employed in the mass production of components of one kind, parts cannot quickly be press-fitted into workpieces. Since the parts supply device is placed rearwardly of the automatic press-fitting apparatus and the automatic press-fitting apparatus is turned, the space which is required by the parts supply device and the automatic press-fitting apparatus is relatively large.

SUMMARY OF THE INVENTION

It is an object of the present invention to provide a system for and a method of press-fitting parts efficiently and accurately into a workpiece.

Another object of the present invention is to provide a system for press-fitting a part into a workpiece, comprising a positioning device for positioning a workpiece; and a pressing device for press-fitting a part into the workpiece which is positioned by the positioning device, the positioning device comprising a jig base having a stationary reference surface, a movable table movable toward and away from the stationary reference surface, and pushing means for pushing the movable table to create a gap between an end surface of the workpiece and the stationary reference surface when the workpiece is placed on the movable table, the pressing device comprising a presser unit including a presser rod for holding the part thereon, the presser unit being movable toward and away from the movable base, and presser means for pressing the end surface of the workpiece against the stationary reference surface to position the workpiece before the part is press-fitted into the workpiece by the presser rod.

Still another object of the present invention is to provide he system wherein the pushing means comprises a resilient element, and a pusher rod engaging the resilient element, for resiliently pushing the movable table to create the gap between the end surface of the workpiece and the stationary reference surface.

Yet another object of the present invention is to provide the system wherein the pushing means comprises a resilient element, and a clamp rod engaging the resilient element, for resiliently pushing either the workpiece or the movable table to press the end surface of the workpiece against the stationary reference surface, thereby positioning the workpiece.

Yet still another object of the present invention is to provide the system further comprising clamping means for holding the workpiece on the movable table.

Still another object of the present invention is to provide the system further comprising a feed device having gripping means for placing and removing the workpiece on and from the movable table.

A further object of the present invention is to provide the system wherein the gripping means comprises an actuator, at least a pair of arms movable toward and away from each other by the actuator, and a holder for resiliently holding the workpiece under pressure when the part is press-fitted into the workpiece.

A still further object of the present invention is to provide the system further comprising a support device for supporting the presser unit against movement away from the workpiece when the part is press-fitted into the workpiece by the presser rod.

A yet further object of the present invention is to provide a system for press-fitting a part into a workpiece, comprising a pressing device for press-fitting a part into a workpiece, the pressing device comprising a first actuator, a presser unit movable toward and away from the workpiece by the first actuator, a second actuator mounted on the presser unit, and a presser rod disposed coaxially with the second actuator and operable by the second actuator for press-fitting the part into the workpiece.

A yet still further object of the present invention is to provide the system further including another second actuator and another presser rod, the arrangement being such that the second actuators are successively operated to press-fit parts held respectively on the presser rods alternately into the workpiece.

A further object of the present invention is to provide the system wherein the second actuator comprises a cylinder having a piston rod extending therefrom, further including an intermediary presser engaging a resilient element and disposed coaxially between the piston rod and the presser rod.

Another object of the present invention is to provide a system for press-fitting a part into a workpiece, comprising a pressing device having a presser unit including a presser rod for holding a part to be press-fitted into a workpiece, the presser unit being movable toward and away from the workpiece, and a support device engageable with the presser unit, for supporting the presser unit against movement away from the workpiece when the part is press-fitted into the workpiece.

Still another object of the present invention is to provide the system wherein the presser unit has a first locking member, and the support device has an actuator and a second locking member movable into and out of locking engagement with the first locking member in response to operation of the actuator.

Still another object of the present invention is to provide the system wherein the first locking member is disposed on at least one side surface of the presser unit, the second locking member being movable in a direction transverse to the direction in which the presser unit is movable, the support device further including a resilient element for biasing the second locking member in locking engagement with the first locking member to hold the presser unit.

Yet another object of the present invention is to provide the system wherein the first and second locking members have slanted surfaces, respectively, the arrangement being such that when the presser unit is moved toward the workpiece, the second locking member is displaced away from the presser unit by sliding engagement between the slanted surfaces, and then the first and second locking members are brought into locking engagement with each other, so that the presser unit is held by the support device.

A further object of the present invention is to provide a system for press-fitting a part into a workpiece, comprising a presser rod for press-fitting a part into a workpiece, and a parts supply device for supplying the part to the presser rod, the parts supply device comprising a feed mechanism for feeding a part, and a holder unit movable back and forth in a direction transverse to the direction in which the part is press-fitted into the workpiece, for holding a part fed by the feed mechanism, the holder unit being also movable back and forth in the direction in which the part is press-fitted into the workpiece, for placing the part on the presser rod, the holder unit being disposed between the presser rod and the workpiece.

A still further object of the present invention is to provide the system wherein the feed mechanism intermittently feed at least two parts at a time, the holder unit having two storage regions for storing and positioning the parts fed by the feed mechanism.

A still further object of the present invention is to provide the system further including another presser rod for press-fitting a part into the workpiece, the holder unit comprising part positioning mechanisms for positioning the parts in the storage regions, respectively, the part positioning mechanisms being movable away from the parts in the storage regions when the parts are placed on the presser rods, respectively.

A still further object of the present invention is to provide the system further comprising a part delivery mechanism for rotating the part and positioning the part in a given angular position on the presser rod when the part is placed on the presser rod.

A yet further object of the present invention is to provide a system for press-fitting a part into a workpiece, comprising a presser rod for press-fitting a part into a workpiece, and a parts supply device for supplying the part to the presser rod, the parts supply device comprising a holder unit having a storage region for holding the part with a positioning groove thereof being oriented toward the presser rod, the holder unit being movable to and away from an axial direction of the presser rod, and a part delivery mechanism mounted on the holder unit, for delivering the part to the presser rod, the part delivery mechanism comprising a presser disposed coaxially with the storage region, driver means for driving the presser to press the part out of the storage region toward the presser rod, and rotative drive means for rotating the part through the presser until a positioning projection on the presser rod is fitted into a positioning groove in the part.

A yet still further object of the present invention is to provide the system wherein the presser comprises at least one pin movable back and forth and fittable in a second positioning groove defined in one side of the part, the pin being rotatable by the rotative means to rotate the part until the positioning projection on the presser rod is fitted into the first-mentioned groove defined in another side of the part, and a resilient element engaging the pin.

Still another object of the present invention is to provide the system wherein the rotative drive means comprises a rotor, a clutch element engageable with the rotor, and a rotatable shaft on which the presser is coaxially mounted, the rotatable shaft being axially movable and rotatable with the clutch element.

Yet another object of the present invention is to provide the system further comprising at least one dog disposed on the presser and a sensor energizable by the dog, the arrangement being such that the positioning projection of the presser rod is detected as being fitted in the positioning groove in the part when the sensor is continuously energized by the dog for a predetermined period of time.

A further object of the present invention is to provide the system wherein the driver means comprises an actuator for displacing the rotatable shaft toward and away from the presser rod.

It is also an object of the present invention to provide a method of press-fitting a part into a workpiece, comprising the steps of positioning a part and a presser rod coaxially with each other while a positioning groove defined in the part is being oriented toward the presser rod, rotating the part while holding the part and the presser rod against each other, so that a positioning projection of the presser rod is fitted into the positioning groove in the part, delivering the part onto the presser rod, and press-fitting the part held on the presser rod into a workpiece.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 is an elevational view of a part positioning mechanism of the parts supply device;

FIG. 16 is an exploded perspective view of a part delivery mechanism of the parts supply device;

FIGS. 17(a) through 17(c) are views showing the manner in which a part is delivered from the parts supply device to a presser rod;

FIGS. 19(a) through 19(c) are fragmentary cross-sectional views illustrative of operation of the parts supply device.

DETAILED PREFERRED EMBODIMENT

Figure 1:
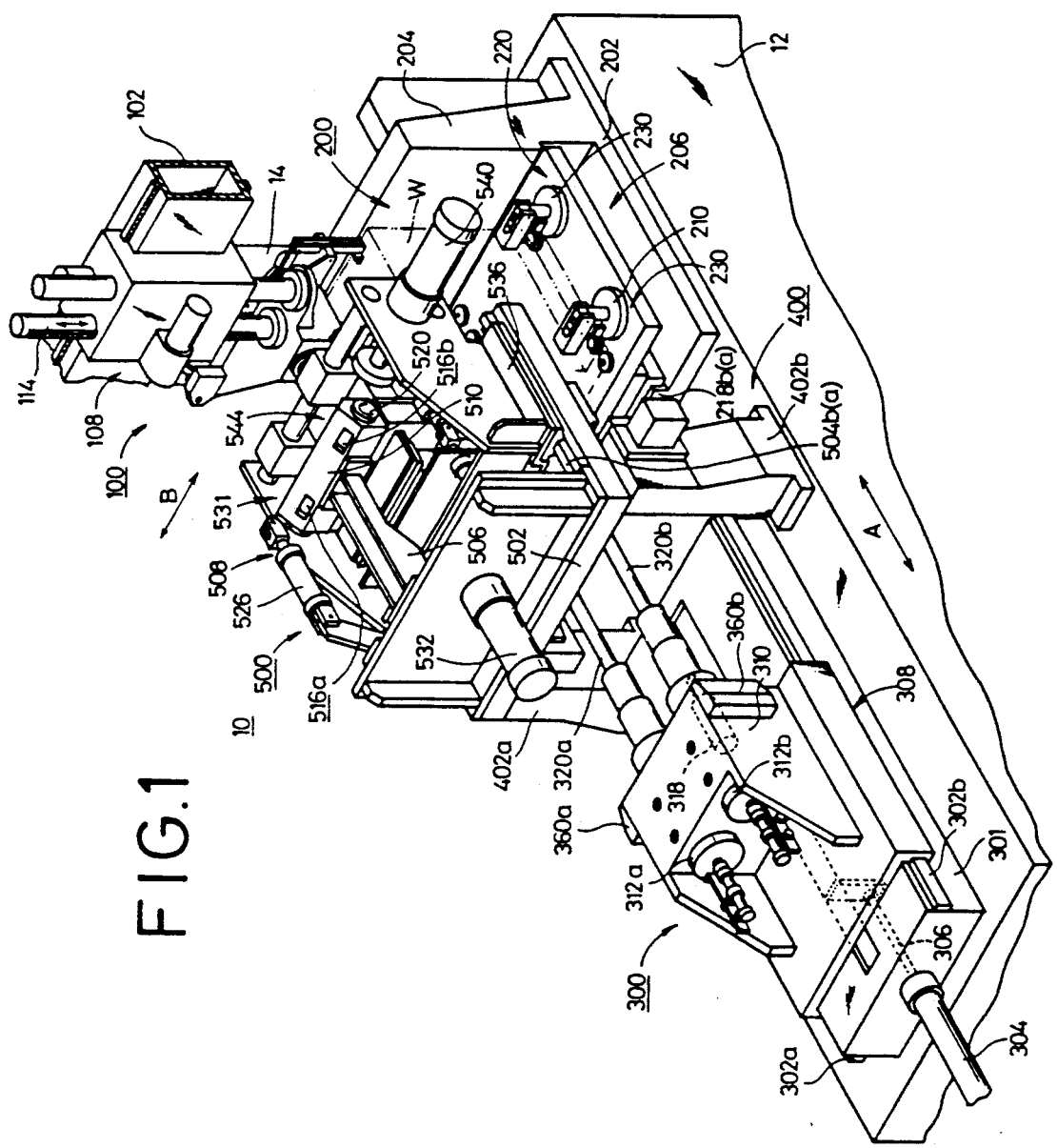
FIG. 1 is a perspective view of an automatic system for press-fitting parts in a workpiece according to the present invention.
Figure 2:
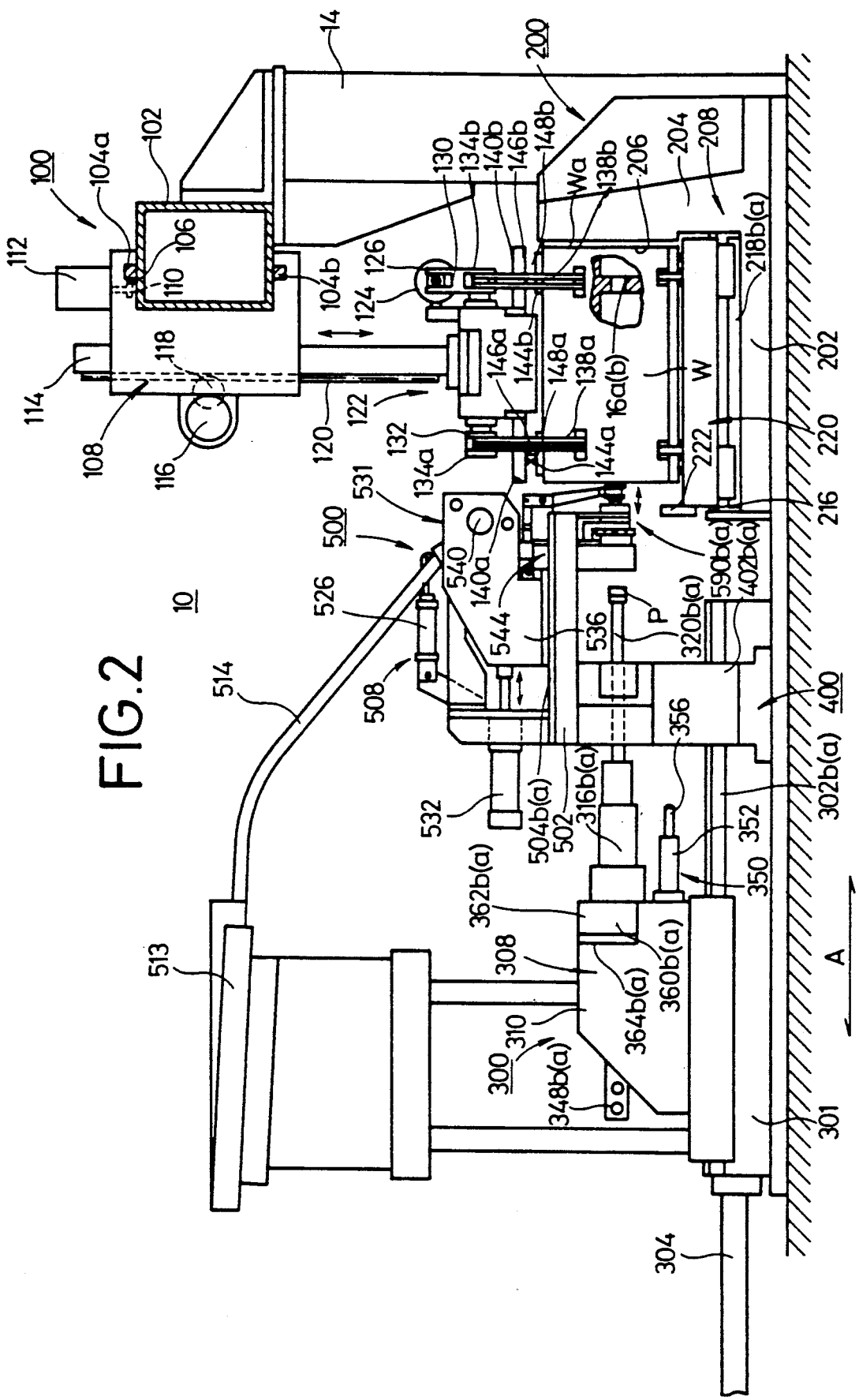
FIG. 2 is a side elevational view of the automatic press-fitting system shown in FIG. 1.

FIGS. 1 and 2 show an automatic system 10 for press-fitting parts into a workpiece according to the present invention. The system 10 includes a foundation base 12 with an upstanding support post 14 mounted on one side thereof. A feed device 100 is mounted on the support post 14, for feeding a workpiece W into the system 10 and also to another processing station (not shown).

A positioning device 200 for positioning and holding the workpiece W is mounted on the foundation base 12 below the feed device 100. A pressing device 300 for holding parts P such as bearings, for example, and press-fitting the parts P into holes 16a, 16b defined in the workpiece W is also disposed on the foundation base 12 in spaced-apart relationship to the positioning device 200.

Between the positioning device 200 and the pressing device 200, there is disposed a support device 400 for supporting presser units (described later) when the parts P are press-fitted into the workpiece W. The support device 400 supports a parts supply device 500 thereon.

Figure 3:
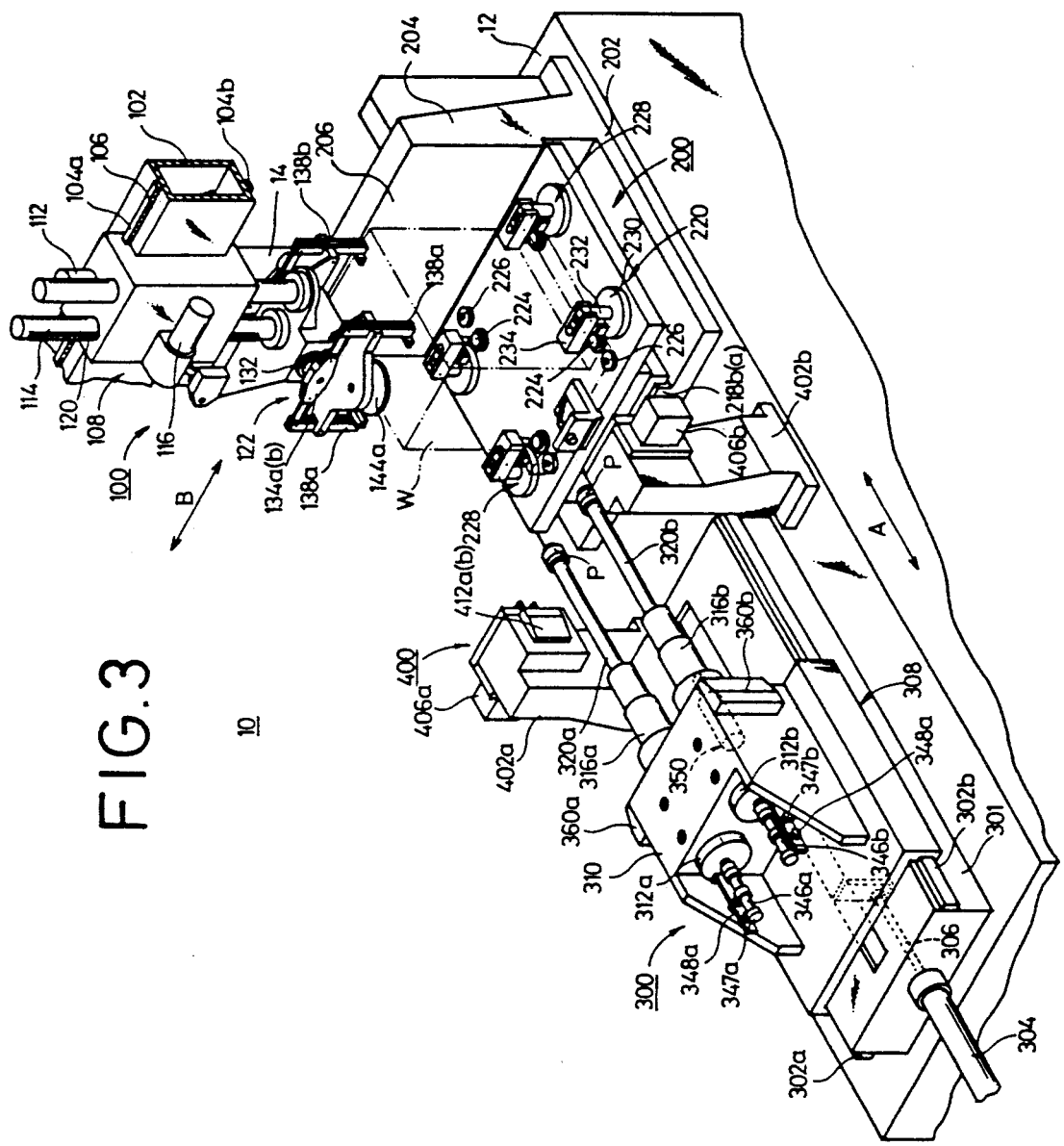
FIG. 3 is a perspective view of the automatic press-fitting system with a parts supply device omitted from illustration.
Figure 4:
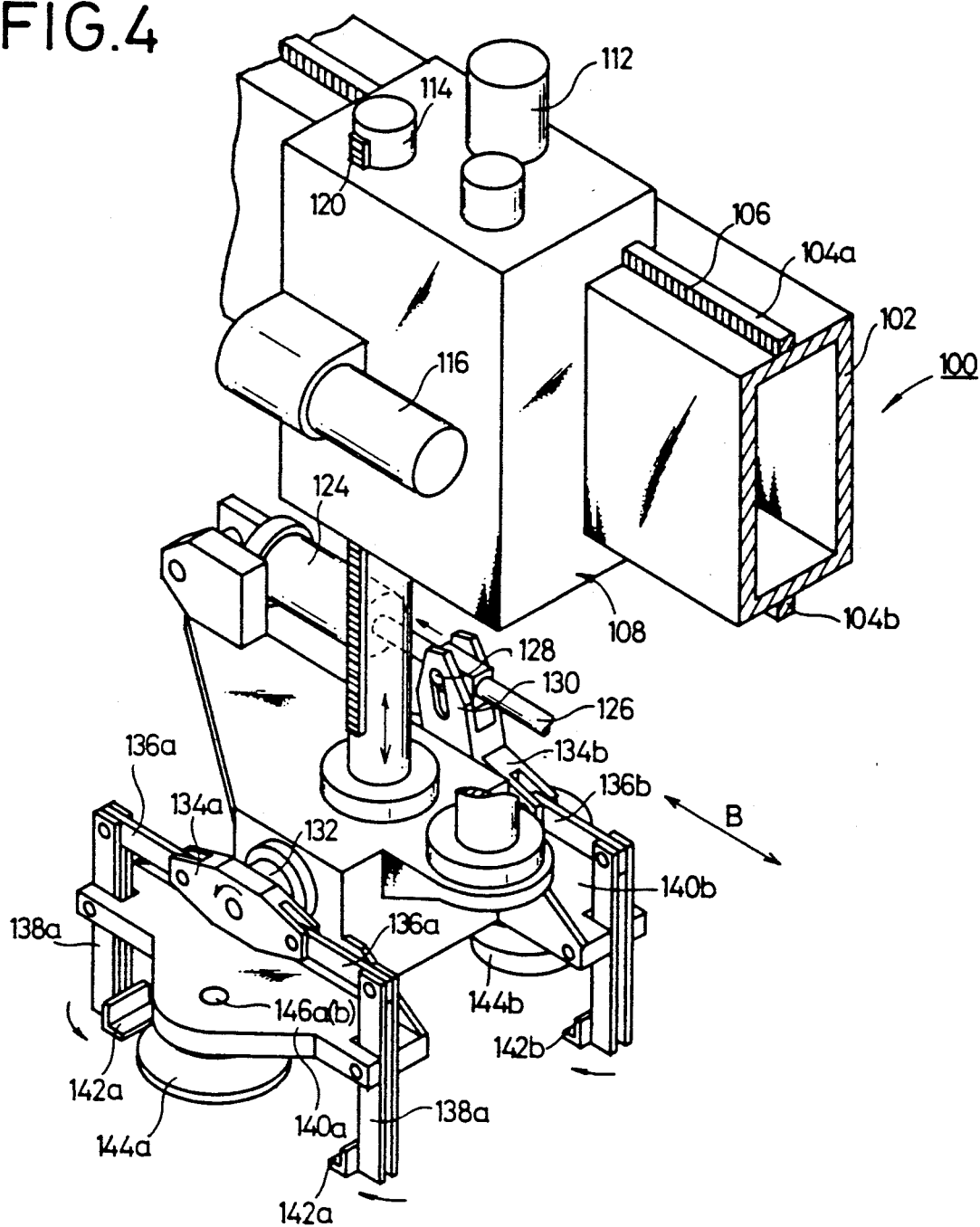
FIG. 4 is perspective view of a feed device of the automatic press-fitting system.

As illustrated in FIGS. 2 through 4, the feed device 100 includes a hollow block 102 in the shape of a rectangular parallelepiped. The hollow block 102 extends in a direction (indicated by the arrow B) normal to the direction (indicated by the arrow A) in which parts P are press-fitted into a workpiece W. The hollow block 102 is secured to the support post 14. A pair of guide rails 104a, 104b is fixedly mounted on upper and lower surfaces, respectively, of the block 102. A rack 106 extending in the direction indicated by the arrow B is fixed to one side of the guide rail 104a. A movable body 108 is held in engagement with the rack 106 and the guide rails 104a, 104b for movement therealong. The movable body 108 supports on its upper surface a rotative drive source 112 for rotating a pinion 110 (FIG. 2) which is held in mesh with the rack 106. A vertically movable rod 114 extends vertically through the movable body 108. The movable body 108 also supports on its side a rotative drive source 116 extending horizontally. The rotative drive source 116 has a pinion 118 (FIG. 2) held in mesh with a rack 120 mounted vertically on a side of the vertically movable rod 114.

The vertically movable rod 114 supports on its lower end a gripper mechanism 122 which includes a cylinder 124 having a horizontally extending piston rod 126. A swingable member 130 is coupled to the piston rod 126 by a pin 128 and mounted on a rotatable shaft 132 with arms 134a, 134b affixed to its opposite ends. The arm 134a is coupled at its opposite ends to ends of two links 136a whose other ends are coupled to upper ends of two arms 138a. The arms 138a are swingably supported at substantially centers thereof on a frame 140a. L-shaped receivers 142a are secured to the respective lower ends of the arms 138a.

The arm 134b and its associated components are structurally identical to the arm 134a and its associated components described above. The components associated with the arm 134b are therefore denoted by identical reference numerals with a suffix b, and will not be described in detail.

Two holders 144a, 144b for pressing the upper surface of the workpiece W are supported by the frames 140a, 140b, respectively. The holders 144a, 144b are vertically slidable along respective guide rods 146a, 146b which extend downwardly from the respective frames 140a, 140b. Resilient elements 148a, 148b are interposed between the holders 144a, 144b and the frames 140a, 140b. The holders 144a, 144b have smooth lower surfaces which are positioned for direct engagement with the workpiece W.

The piston rod 126 extending from the cylinder 124 may be longer and extend into engagement with a gripper mechanism (not shown) for gripping a workpiece W in another station different from the system 10. With this arrangement, a plurality of workpieces W can be gripped simultaneously through the single cylinder 124.

The positioning device 200 includes a jig base 202 placed on the foundation base 12. The jig base 202 has an upwardly projecting protrusion 204 on one end thereof. The protrusion 204 has a smooth vertical stationary reference surface 206 facing toward the pressing device 300.

Figure 5:
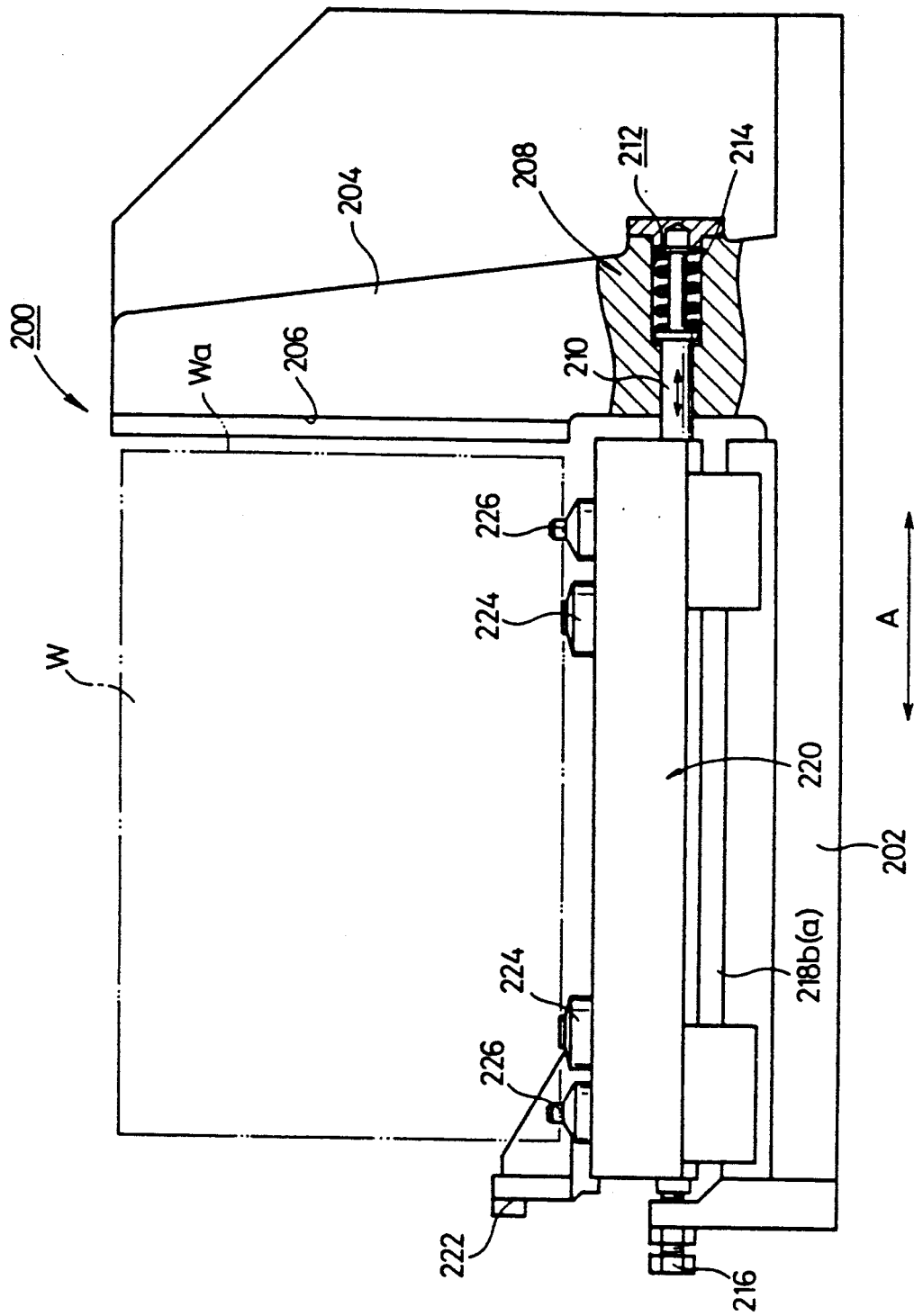
FIG. 5 is a side elevational view, partly in cross section, of a positioning device of the automatic press-fitting system.

A pusher unit 208 (FIG. 5) is mounted in a lower portion of the protrusion 204. The pusher unit 208 comprises a pusher rod 210 fitted in a stepped hole 212 defined horizontally in the protrusion 204. The pusher rod 210 has an outer end projecting out of the hole 212 beyond the stationary reference surface 206. A resilient element 214 in the form of a helical spring is disposed in a larger-diameter portion of the stepped hole 212, for normally urging the pusher rod 210 to cause the outer end thereof to project from the stationary reference surface 206. A stopper bolt 216 is positionally adjustably threaded in the jig base 202 in aligned confronting relation to the pusher rod 210. Between the stopper bolt 216 and the pusher rod 210, there are disposed a pair of guide rails 218a, 218b and a support table 220, the guide rails 218a, 218b extending in the direction indicated by the arrow A and fixed to the jig base 202. The support table 220 is movably placed on the guide rails 218a, 218b.

Figure 6:
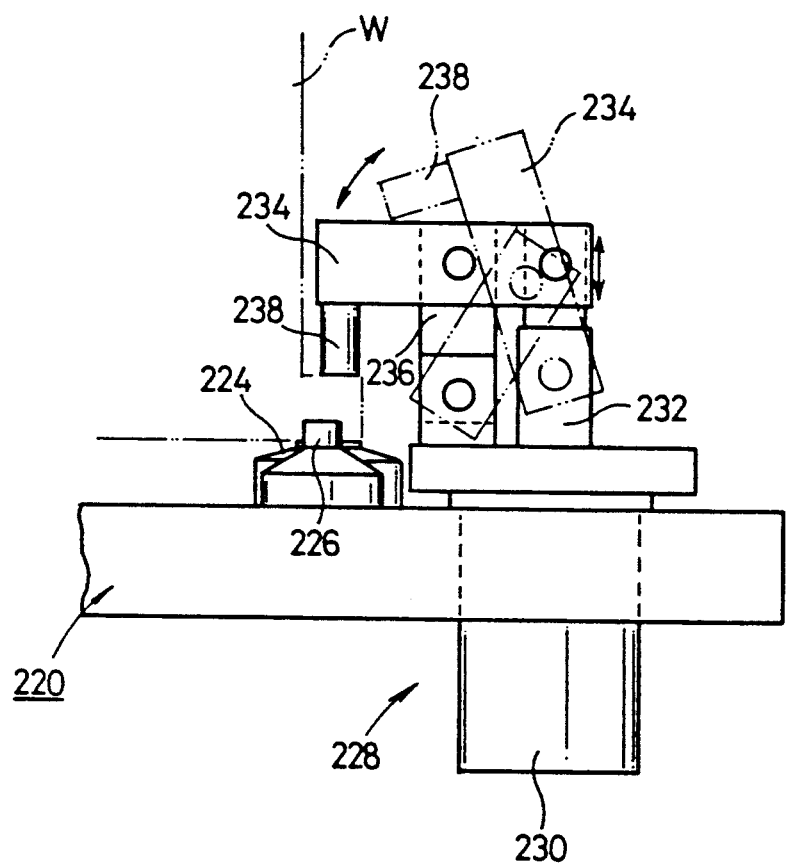
FIG. 6 is an enlarged elevational view of a clamp unit of the automatic press-fitting system.

A bearing plate 222 is fixed to one end of the support table 220. A plurality of reference seats 224, a plurality of positioning pins 226, and a plurality of clamp units 228 for clamping the workpiece W on the support table W are fixedly mounted on the upper surface of the support table 220. As shown in FIG. 6, each of the clamp units 228 has a cylinder 230 which includes an upwardly extending piston rod 232 to which one end of a clamp arm 234 is coupled. The clamp arm 234 has a central portion coupled to a swingable link 236 with a presser 238 fixed to a distal end thereof. The clamp units 228 are positioned such that they press and support the lower end of the workpiece W at four positions.

Figure 7:
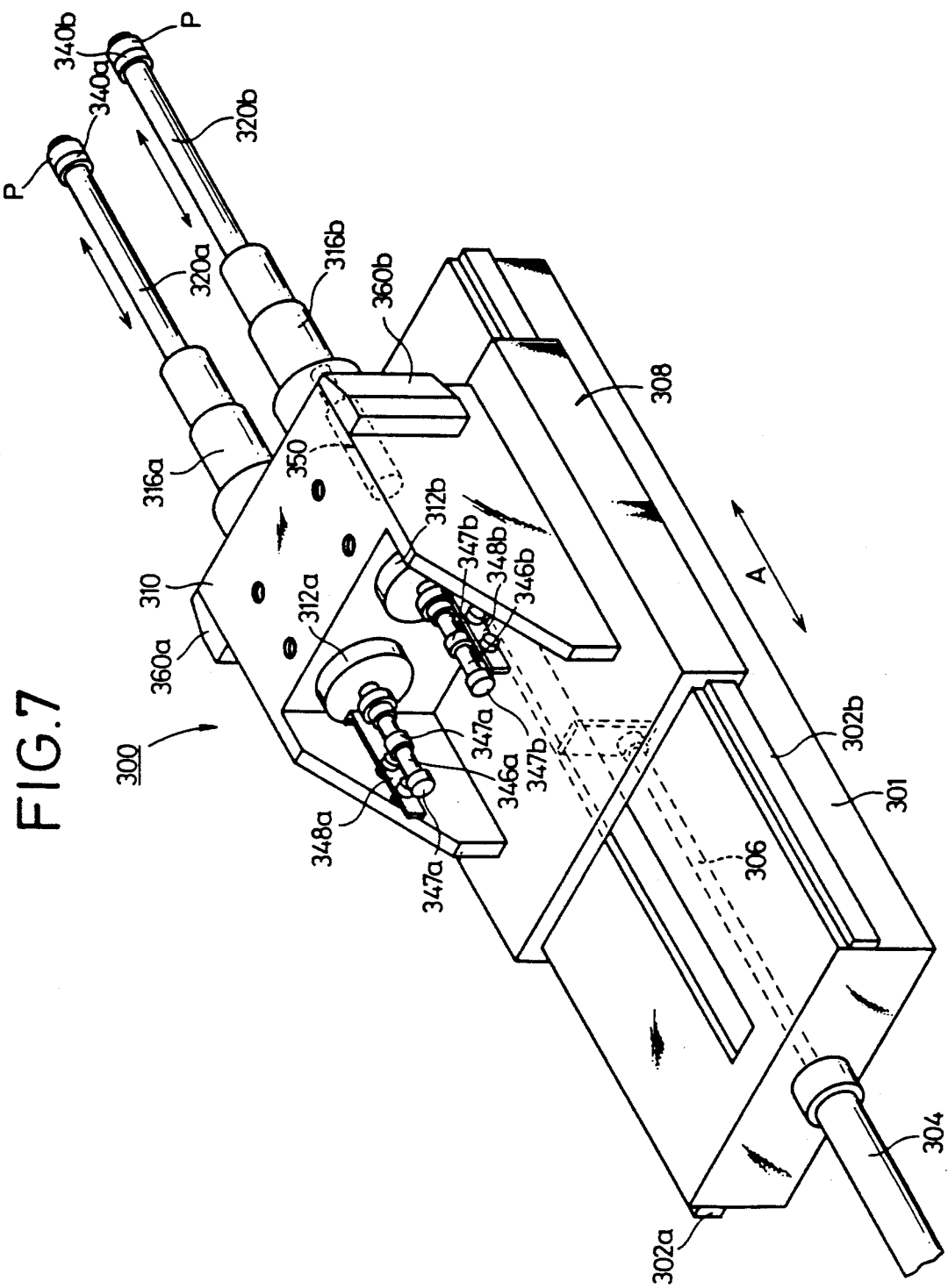
FIG. 7 is a perspective view of a pressing device of the automatic press-fitting system.

The pressing device 300 comprises a rectangular base 301 which extends from one end of the foundation base 12 to a position near the jig base 202 of the positioning device 200. As shown in FIG. 7, two guide rails 302a, 302b are fixedly attached to opposite vertical sides of the base 301 which extend longitudinally thereof. A first actuator which comprises a shifting cylinder 304 is mounted on one end of the base 301. The shifting cylinder 304 has a piston rod 306 extending in the direction indicated by the arrow A and coupled to a presser unit 308 which is slidably held in engagement with the guide rails 302a, 302b.

Figure 8:
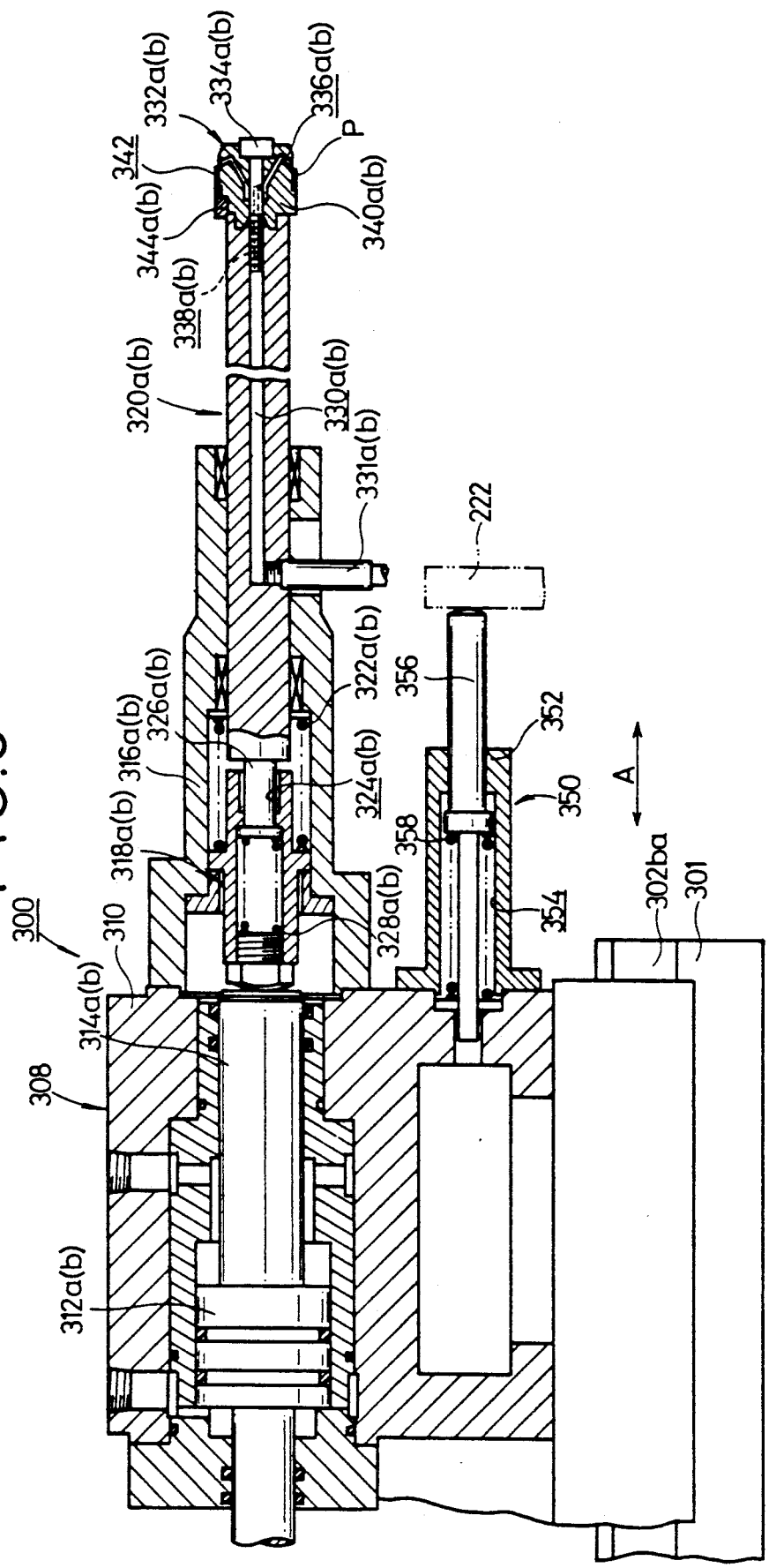
FIG. 8 is a cross-sectional view of the pressing device.
Figure 9:
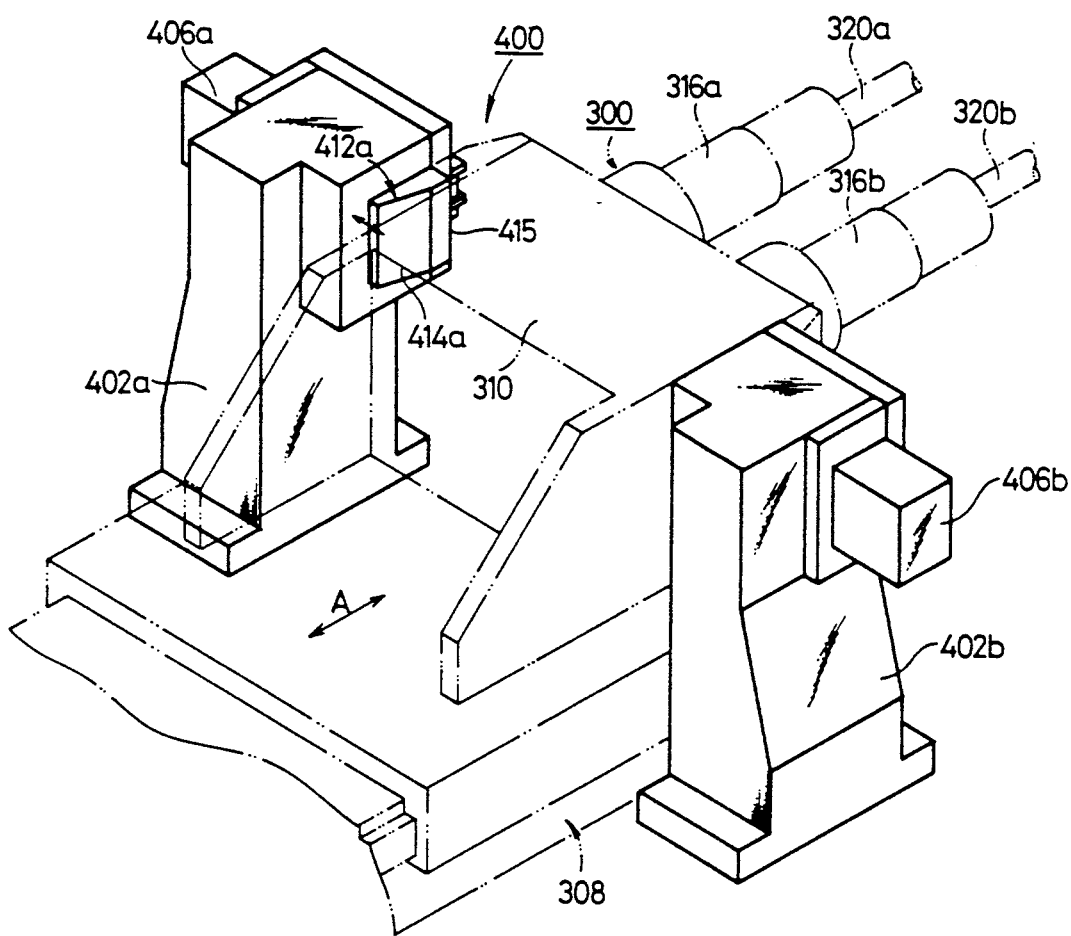
FIG. 9 is a perspective view of a support device of the automatic press-fitting system.

The presser unit 308 includes a unit body 310 connected to the piston rod 306 and movable back and forth along the guide rails 302a, 302b. A second actuator which comprises a pair of pressing cylinders 312a, 312b is mounted on the unit body 310. As shown in FIG. 8, the pressing cylinder 312a has a piston rod 314a extending in the unit body 310. A holder 316a is mounted on the front face of the unit body 310 and accommodates therein an intermediary presser 318a and a presser rod 320a which are held coaxially with the piston rod 314a. The intermediary presser 318a is axially slidably situated in the holder 316a and is normally urged toward the piston rod 314a by a resilient element 322a in the form of a helical spring which is disposed in the holder 316a. The intermediary presser 318a has a stepped hole 324a defined centrally therein. The presser rod 320a has a smaller-diameter portion 326a fitted in the stepped hole 324a. A helical spring 328a disposed in the intermediary presser 318a acts on the inner end of the smaller-diameter portion 326a.

The presser rod 320a extends through and projects out of the holder 316a toward the positioning mechanism 200, the presser rod 320a having an air supply passageway 330a defined axially centrally in the presser rod 320a. The air supply passageway 330a has one end directed radially outwardly in the holder 316a and connected to a pipe 331a. The other end of the air supply passageway 330a opens outwardly through the distal end of the presser rod 320a.

A substantially cylindrical support 332a is fixed to the distal end of the presser rod 320a by a bolt 334a. The support 332a has four outlet passages 336a defined therein and spaced at angularly equal intervals. The outlet passages 336a are inclined radially outwardly and then bent sharply toward the presser rod 320a, and open radially outwardly at the outer circumferential surface of the support 332a. The outlet passages 336a are held in communication with the air supply passageway 330a through a passage 338a which is defined in the bolt 334a. The support 332a has an outside diameter such that it is snugly fitted in an inner circumferential surface of a part P. The support 332a also has a flange 340a for abutting engagement with an end of the part P. The flange 340a has a positioning projection 344a which will be fitted in a positioning groove 342 in the part P to position the part P with respect to the presser rod 320a. The positioning groove 342 is defined in each of opposite sides of the part P, which has an oil hole 343 defined therein in a certain positional relationship to the positioning groove 342 (see FIG. 16).

The pressing cylinder 312b is structurally identical to the pressing cylinder 312a. The components of the pressing cylinder 312b and those associated with the pressing cylinders 312b which are identical to those of the pressing cylinder 312a are denoted by identical reference numerals with a suffix b, and will not be described in detail.

Piston rods 346a, 346b also extend respectively from the pressing cylinders 312a, 312b away from the respective piston rods 314a, 314b. The piston rods 346a, 346b support respective dogs 347a, 347b which are engageable by position sensors 348a, 348b in the form of limit switches. Therefore, the position sensors 348a, 348b can detect linear displacements of the pressing rods 320a, 320b.

As shown in FIG. 8, a presser unit 350 is mounted on the front face of the unit body 310 and disposed between and below the holders 316a, 316b. The presser unit 350 has a substantially cylindrical holder 352 secured to the unit body 310 and having a central stepped hole 354 with an end of a clamp rod 356 being inserted therein. The clamp rod 356 is normally urged by a resilient element 358 such as a helical spring acting on the inner end of the clamp rod 356, so that the outer end of the clamp rod 356 projects from the holder 352 in a direction away from the unit body 310.

In FIG. 7, two first locking members 360a, 360b are mounted on opposite sides of the unit body 310 and project outwardly away from each other. The first locking members 360a, 360b have respective slanted surfaces 362a, 362b (FIG. 10) inclined outwardly in a rearward direction (away from the positioning device 200), and respective locking surfaces 364a, 364b extending outwardly perpendicularly to the unit body 310. The slanted surfaces 362a, 362b and the locking surfaces 364a, 364b engage the support device 400 (see FIG. 10).

The support device 400 has a pair of support columns 402a, 402b (FIGS. 1 and 3) disposed one on each side of the pressing device 300 and extending upwardly from the foundation base 12. Since the support columns 402a, 402b are identical in construction, only the support column 402a will be described below, and the components of the support column 402b which are identical to those of the support column 402a are denoted by identical reference numerals with a suffix b and will not be described in detail.

Figure 10:
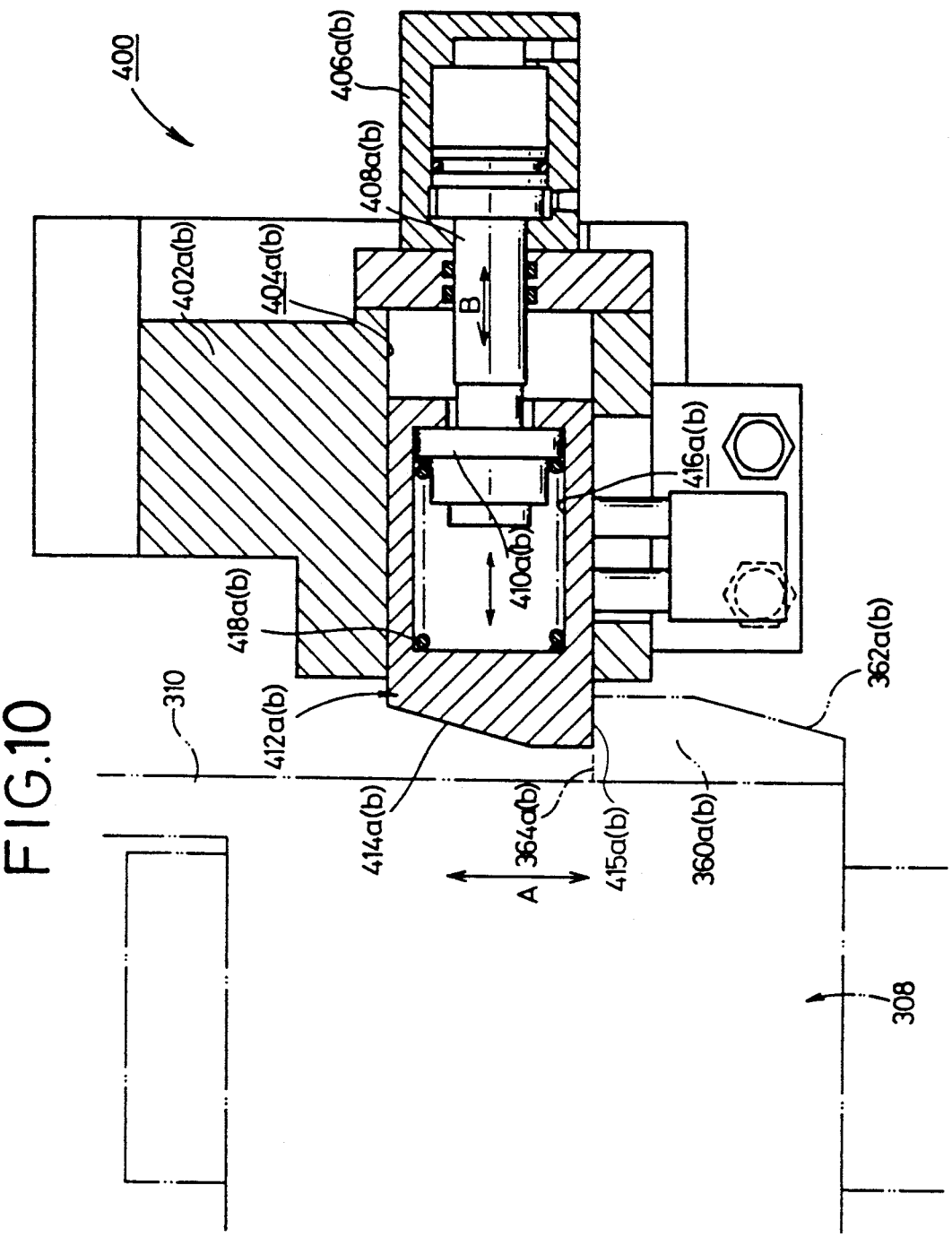
FIG. 10 is a plan view, partly in cross section, of the support device shown in FIG. 9.

As shown in FIG. 10, the support column 402a has an opening 404a defined in the shape of a rectangular parallelepiped in an upper portion thereof and extending horizontally in the direction indicated by the arrow B. A cylinder 406a is attached to the support column 402a in closing relation to one end of the opening 404a. The cylinder 406a has a piston rod 408a extending into the opening 404a. A second locking member 412a engages a spring seat 410a mounted on the distal end of the piston rod 408a. The second locking member 412a comprises a box-shaped casing slidably fitted in the opening 404a and has an end projecting from the opening 404a. The projecting end of the second locking member 412a has a slanted surface 414a complementary to the slanted surface 362a of the first locking member 360a, and a locking surface 415a complementary to the locking surface 364a of the first locking member 360a. The second locking member 412a has an opening 416a defined therein and in which the spring seat 410a is disposed. A resilient element 418a in the form of a helical spring is disposed in the opening 416a and acts between one end of the opening 416a and the spring seat 410a. The second locking member 412a is normally biased to move away from the piston rod 408a under the resiliency of the spring 418a.

The parts supply device 500 has a frame 502 (FIGS. 1 and 2) which is bolted to the support columns 402a, 402b. A pair of guide rails 504a, 504b, which extends in the direction indicated by the arrow A, is mounted on an upper surface of the frame 502. A stay 506, which also extends in the direction indicated by the arrow A, is fixed at one end to an upper portion of the frame 502 A feed mechanism 508 is coupled to the other end of the stay 506.

Figure 11:
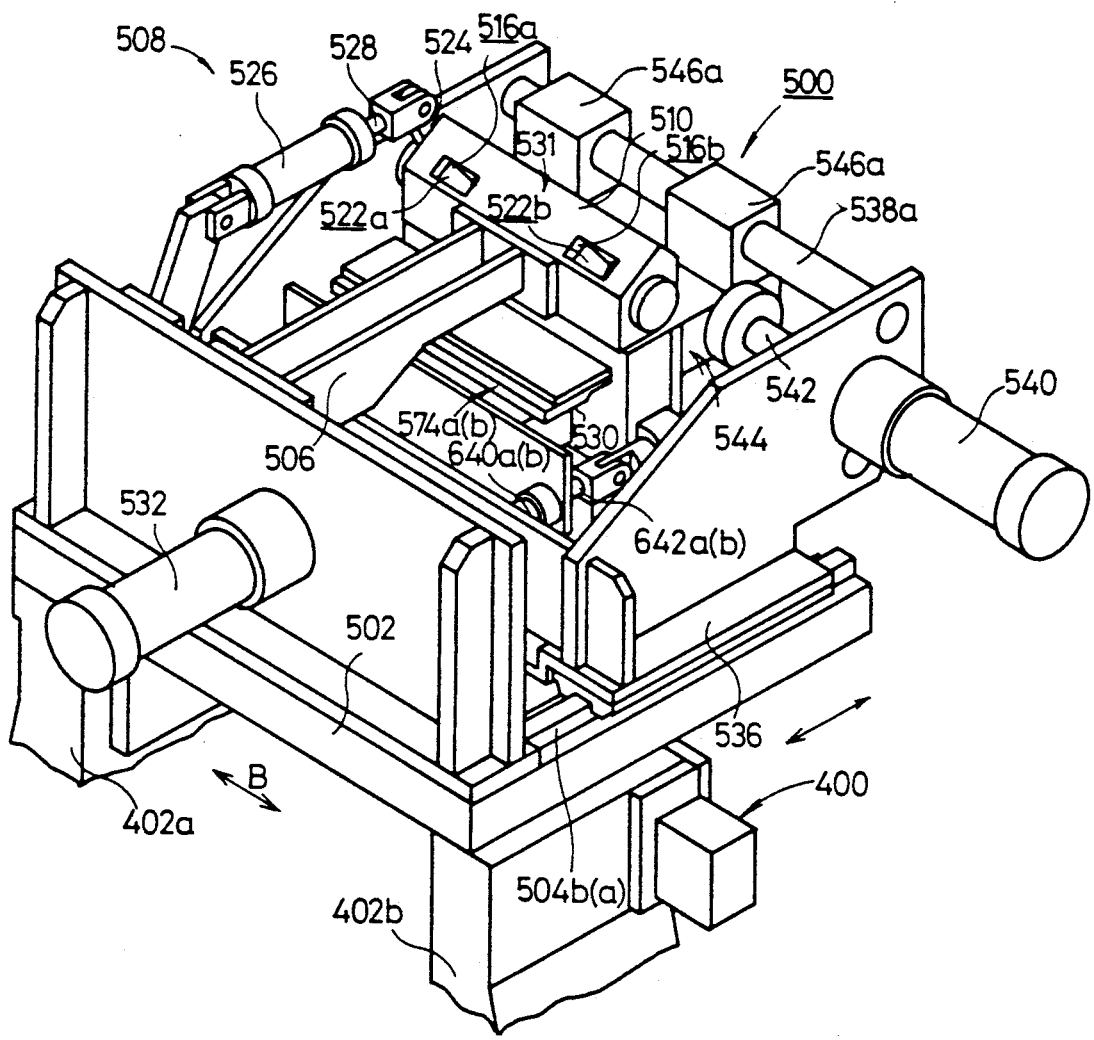
FIG. 11 is a perspective view of the parts supply device of the automatic press-fitting system.
Figure 12:
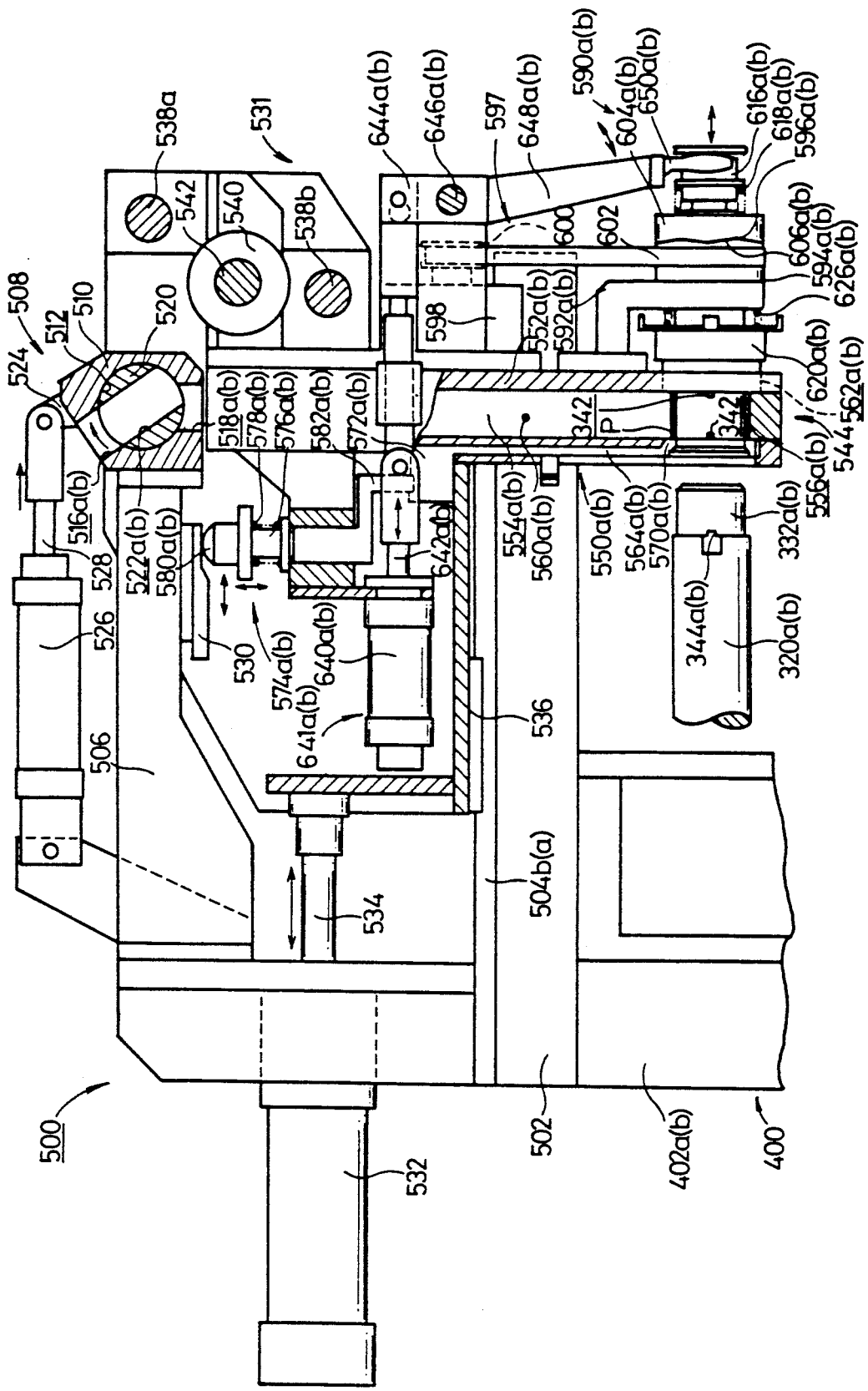
FIG. 12 is an enlarged side elevational view, partly in cross section, of the parts supply device.

As shown in FIGS. 11 and 12, the feed mechanism 508 includes a holder 510 secured at its center to the stay 506 and extending in the direction indicated by the arrow B. The holder 510 has a longitudinal hole 512 defined therethrough. The holder 510 also has parts inlet ports 516a, 516b for receiving parts P intermittently fed from a parts feeder 513 through a chute 514, the parts inlet ports 516a, 516b having a rectangular cross section and being inclined with respect to the vertical direction. The holder 510 further has parts outlet ports 518a, 518b for dropping parts P into a parts holder unit (described later on). The parts inlet ports 516a, 516b and the parts outlet ports 518a, 518b communicate with the hole 512.

A cylindrical body 520 is slidably fitted in the hole 512 and has openings 522a, 522b defined diametrically therein near its opposite ends. The cylindrical body 520 is angularly movable in the hole 512 so that the openings 522a, 522b can communicate with the parts inlet ports 516a, 516b and the parts outlet ports 518a, 518b. Each of the openings 522a, 522b is dimensioned such that it can receive one part P at a time. The cylindrical body 520 has an outer exposed end which is coupled to a cylinder 526 through an arm 524. The cylinder 526 is swingably supported on the upper portion of the frame 502 and has a piston rod 528 coupled to the arm 524.

A cam plate 530, which serves as a means for opening and closing support arms (described later), is mounted on a lower surface of the stay 506.

A parts holder unit 531 is mounted on the frame 502 for back-and-forth movement in the direction indicated by the arrow B. More specifically, a shifting cylinder 532 is mounted on the frame 502 and has a piston rod 534 fixed to a movable base 536 which is placed on the guide rails 504a, 504b. A pair of parallel guide bars 538a, 538b extending in the direction indicated by the arrow B is mounted on the movable base 536. A cylinder 540 is also mounted on the movable base 536 in a position between the guide bars 538a, 538b and has a piston rod 542 which is coupled to a unit body 544 (see FIG. 13). The unit body 544 has guide blocks 546a, 546b in which the guide bars 538a, 538b are slidably fitted. The unit body 544 is positioned in the direction indicated by the arrow B when it is engaged by positioning stoppers 548a, 548b which are positionally adjustably attached to opposite sides of the movable base 536.

Figure 14:
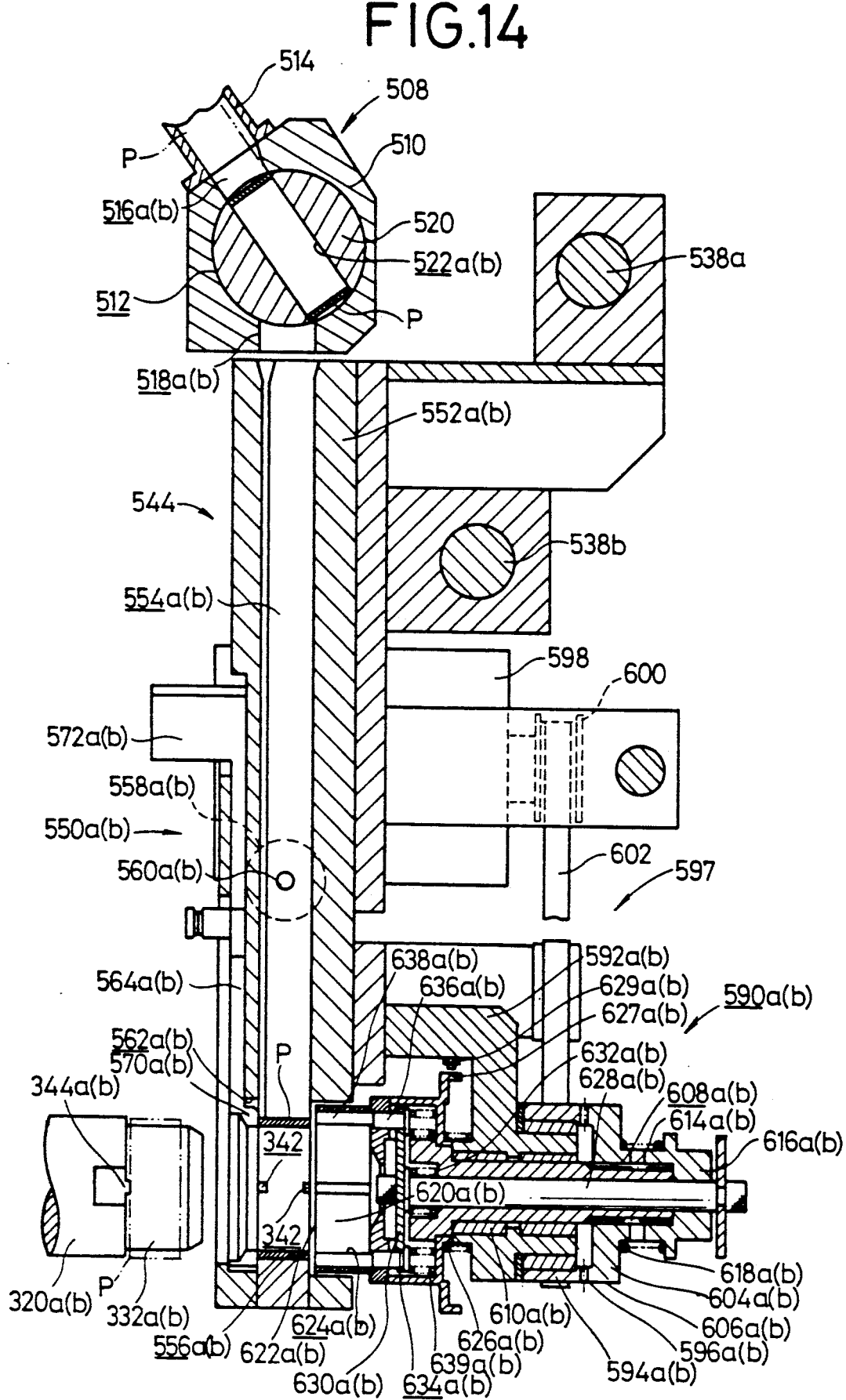
FIG. 14 is a vertical cross-sectional view of the parts supply device.

The unit body 544 has part positioning mechanisms 550a, 550b (FIG. 12). As shown in FIG. 14, the part positioning mechanism 550a comprises an elongate rectangular block 552a extending vertically and positionable below the parts outlet port 513 of the feed mechanism 508. The elongate rectangular block 552a has a passage 554a defined vertically therethrough and extending downwardly, the passage 554a having a size corresponding to the diameter and width of parts P. The passage 554a has a lower end communicating with an arcuate storage region 556a having a size corresponding to the diameter of parts P. The storage region 556a has its center displaced a certain distance from the vertical central axis of the passage 554a.

An air cylinder 558a, serving as a parts stopping means, is attached to the elongate rectangular block 552a at a certain vertical position thereon. The air cylinder 558a has a piston rod 560a with its distal end insertable a certain length transversely into the passage 554a.

An opening 562a is defined in the lower end of the rectangular block 552a in communication with the storage region 556a. Two parts support arms 564a are positioned in one end of the opening 562a. As shown in FIG. 15, the parts support arms 564a have upper portions swingably supported on the rectangular block 552a by respective pins 566a. A spring 568a has its opposite ends coupled to the parts support arms 564a below the pins 566a. The parts support arms 564a are normally urged by the spring 568a in a direction to move the lower ends thereof toward each other.

The lower portions of the parts support arms 564a have respective arcuate gripping edges 570a defined in confronting lower portions thereof. The arcuate gripping edges 570a jointly define a circular recess which is of a diameter slightly smaller than the outside diameter of parts P. The arcuate gripping edges 570a enter the opening 562a. The parts support arms 564a, 564b have on their upper ends respective engaging fingers 572a which project upwardly and are spaced apart from each other. The engaging fingers 572a are held in engagement with an arm opening/closing means 574a.

The arm opening/closing means 574a has a rod 576a slidably fitted in the unit body 544. The rod 576a is normally urged to move upwardly by a helical spring 578a disposed around the rod 576a between the unit body 544 and a rotor 580a mounted on the upper end of the rod 576a. The rotor 580a is held in sliding contact with the cam plate 530. A bent finger 582a is connected to the lower end of the rod 576a and has on its lower end a pair of tapered surfaces 584a slidably held against the engaging fingers 572a, respectively, of the parts support arms 564a.

As shown in FIGS. 12 and 14, a part delivery mechanism 590a is positioned at the other end of the opening 562a. The part delivery mechanism 590a has a bracket 592a fixed to the rectangular block 552a, and a rotor 594a rotatably fitted over one end of the bracket 592a. The rotor 594a has teeth 596a on one side thereof, and is rotatable about its own axis by a rotative drive source 598 of a rotative drive means 597. The rotative drive means 597 includes a pulley 600 coupled to the rotative drive source 598 and an endless belt 602 trained around the pulley 600 and the rotor 594a.

A clutch element 604a has teeth 606a held in mesh with the teeth 596a of the rotor 594a. The clutch element 604a also has a splined hole 608a defined centrally therein. A tubular rotatable shaft 610a extends the splined hole 608a, the rotor 594a, and the bracket 592a. The rotatable shaft 610a has splines 614a on one end thereof which are fitted in the splined hole 608a in the clutch element 604a. The splined end of the rotatable shaft 610a is coupled to an engaging member 616a. A helical spring 618a is interposed between the engaging member 616a and the clutch element 604a for normally urging the clutch element 604a toward the rotor 594a.

A part presser 620a is mounted on the other end of the rotatable shaft 610a. As shown in FIG. 16, the part presser 620a comprises a first cylindrical member 621a coupled to the rotatable shaft 610a and a second cylindrical member 625a integrally fixed to the first cylindrical member 621a by a bolt 623a. The second cylindrical member 625a has a part pressing end surface 622a on one end thereof, and four axial guide grooves 624a defined in an inner circumferential surface and spaced at equal angular intervals, the guide grooves 624a opening at the part pressing end surface 622a. The first cylindrical member 621a has four dogs 627a on its outer circumference which are spaced at equal angular intervals (90°) and projecting toward the rotatable shaft 610a. The dogs 627a serve to trigger a proximity switch 629a (FIG. 14) fixed to the bracket 592a and directed downwardly. A helical spring 626a is disposed between the part presser 620a and the bracket 592a.

A rod 628a is disposed in the rotatable shaft 610a and the cap 616a. A plate 630a is mounted on the end of the rod 628a which is positioned in the part presser 620a. A helical spring 632a is interposed between the plate 630a and the rotatable shaft 610a. The plate 630a has four holes 634a defined therein in registry with the guide grooves 624a of the part presser 620a. Part indexing pins 636a are fitted respectively in the holes 634a. The pins 636a are partly cut away, providing flat portions 638a fitted respectively in the guide grooves 624a. Resilient elements 639a in the form of helical springs are interposed between ends of the pins 636a and an inner wall of the part presser 620a.

A driver means 641a for driving the engaging member 616a to move the part presser 620a and the pins 636a toward the part P is mounted on the unit body 544. The driver means 641a comprises an actuator 640a in the form of a cylinder, for example, as shown in FIG. 12. The cylinder 640a has a piston rod 642a coupled to a swing plate 644a swingably supported on a shaft 646a. To the shaft 646a, there is connected one end of an arm 648a which extends downwardly from the shaft 646a. A substantially channel-shaped lever 650a which engages the engaging member 616a is joined to the other end of the arm 648a.

The part positioning mechanism 550b and the part delivery mechanism 590b are structurally identical to the part positioning mechanism 550a and the part delivery mechanism 590a. Those parts of the mechanisms 550b, 590b which are identical to those of the mechanisms 550a, 590a are denoted by identical reference numerals with a suffix b, and will not be described in detail. The part delivery mechanism 590b includes a rotor 594b which is operatively coupled to the belt 602 trained around the pulley 600 connected to the rotative drive source 598.

The automatic press-fitting system according to the present invention is basically constructed as described above. Operation and advantages of the system will be described below.

A workpiece W is fed from another station (not shown) to the positioning device 200 of the system 10 by the feed device 100. More specifically, the cylinder 124 is actuated to retract the piston rod 126 into the cylinder 124 thereby angularly moving the swingable member 130. The arms 134a, 134b are now turned a certain angle by the rotatable shaft 132 to move the lower portions of the arms 138a, 138b, which are coupled to the arms 134a, 134b by the links 136a, 136b, toward the workpiece W. The workpiece W is now held by the receivers 142a, 142b.

Then, the rotative drive source 116 is actuated to rotate the pinion 118 to cause the rack 120 to elevate the vertically movable rod 114, whereupon the workpiece W is suspended by the gripper mechanism 122. The rotative drive source 112 is also actuated to cause the pinion 110 and the rack 106 to displace the movable body 108 along the guide rails 104a, 104b in the direction indicated by the arrow B until the workpiece W is located above the positioning device 200. The rotative drive source 122 is now inactivated, and the rotative drive source 116 is reversed in its operation to cause the pinion 118 and the rack 120 to lower the rod 114. The workpiece W suspended by the gripper mechanism 122 is then placed on the support table 220 through the reference seats 224 and the positioning pins 226.

On the support table 220, the cylinders 230 of the clamp units 228 are operated to displace the piston rods 232 upwardly, thus enabling the clamp arms 234 and the links 236 to press the pressers 238 against the lower end of the workpiece W which is now held in position. In the gripper mechanism 122, the cylinder 124 is actuated to project the piston rod 126, causing the links 136a, 136b coupled to the arms 134a, 134b to move the arms 138a, 138b away from the workpiece W, so that the receivers 142a, 142b are released from the workpiece W. At this time, the holders 144a, 144b are resiliently held against the upper surface of he workpiece W.

The pusher rod 210 of the pusher unit 208 is held against one end of the support table 220 under the resiliency of the spring 214. Therefore, the other end of the support table 220 is held against the stopper bolt 216. An end face Wa (FIG. 5) of the workpiece W which is placed on the support table 220 is spaced a certain distance from the stationary reference surface 206 of the protrusion 204.

In the parts supply device 500, parts P are fed from the parts feeder 513 down the chute 514 to the feed mechanism 508. As shown in FIG. 14, the cylindrical body 20 of the feed mechanism 508 is angularly positioned such that the openings 522a, 522b communicate with the parts inlet ports 516a, 516b of the holder 510. Therefore, the parts P fed from the chute 514 are accommodated one in each of the openings 522a, 522b. Then, the cylinder 526 is operated to displace the piston rod 528 in the direction indicated by the arrow in FIG. 12. The arm 524 is turned to rotate the cylindrical body 520 through a predetermined angle to bring the openings 522a, 522b into registry with the parts outlet ports 518a, 518b. Now, the parts P stored in the respective openings 522a, 522b drop through the parts outlet ports 518a, 518b into the passages 554a, 554b in the elongate rectangular blocks 552a, 552b of the part positioning mechanisms 550a, 550b.

The part positioning mechanism 550a and the part delivery mechanism 590a will be described below. The part P which is supplied into the passage 554a is engaged and stopped by the piston rod 560a serving as the part stopping means which projects into the passage 554a. When the air cylinder 558a is operated, the piston rod 560a is retracted out of the passage 554a, allowing the part P to fall into the storage region 556a. At this time, the arcuate edges 570a of the parts support arms 564a which are positioned on the opposite sides of the opening 562a and the part presser 620a prevent the part P from jumping out of the storage region 556a.

Figure 13:
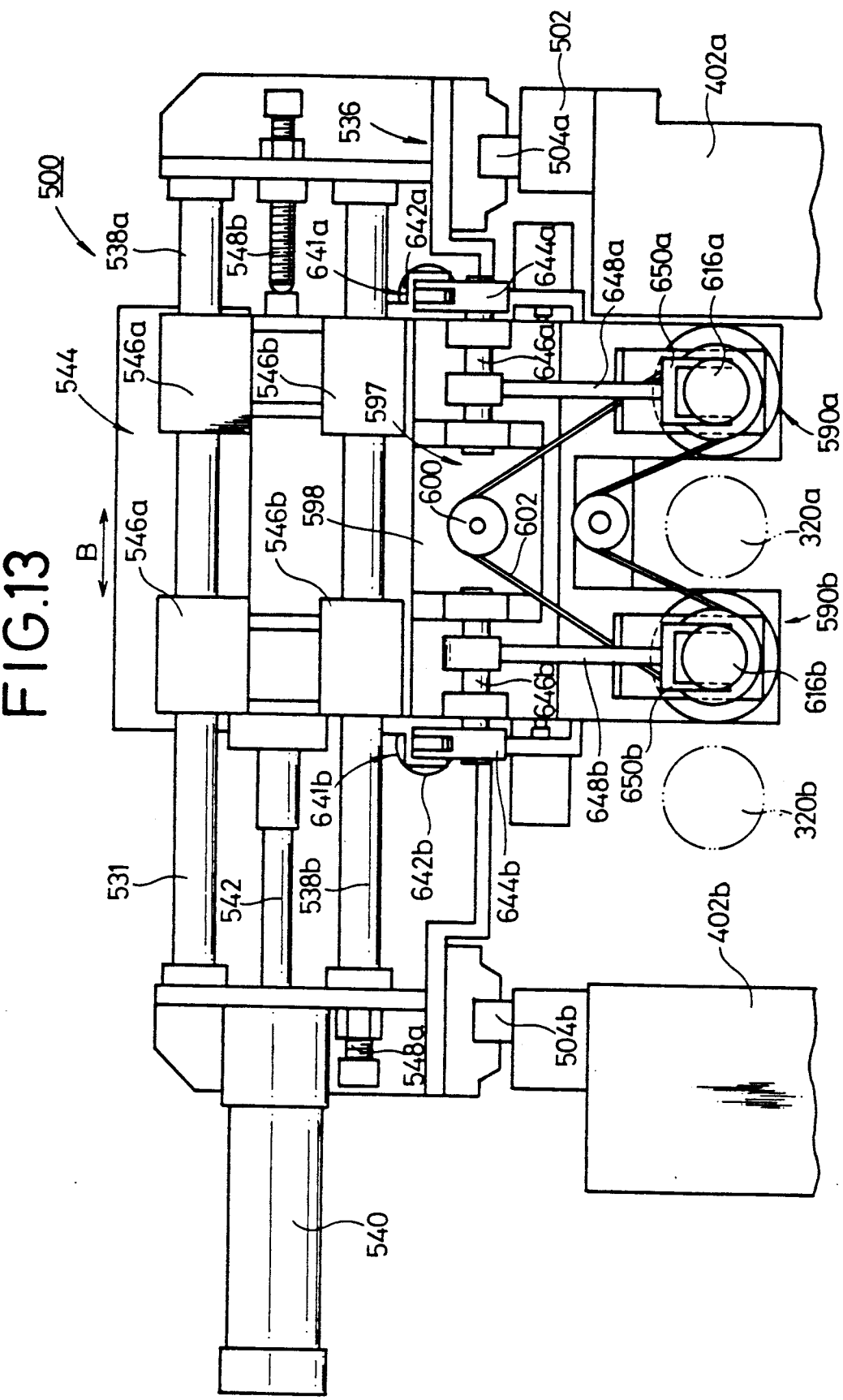
FIG. 13 is a front elevational view of the parts supply device.

The cylinder 540 is now actuated to cause the piston rod 542 to move the unit body 544 along the guide bars 538a, 538b to the left in FIG. 13. The unit body 544 is positioned when it is engaged by the positioning stopper 548a. The part P in the storage region 556a is now aligned with the axis of the presser rod 320a of the pressing device 300.

Then, the shifting cylinder 532 is actuated to move the movable base 536 along the guide rails 504a, 504b toward the pressing device 300. The rotor 580a of the arm opening/closing means 574a engages a thicker portion of the cam plate 530, forcing the rod 576a downwardly against the resiliency of the spring 578a. The tapered surfaces 584a of the finger 582a on the lower portion of the rod 576a engage the engaging fingers 572a of the parts support arms 564a. The parts support arms 564a are now swung against the bias of the spring 568a to displace the lower ends thereof, i.e., the arcuate edges 570a, away from each other (see FIG. 15) about the pins 566a. Then, the cylindrical support 332a on the distal ends of the presser rod 320a is moved through the gap between the arcuate edges 570a and the opening 562a into the rectangular block 552a, whereupon the part P in the storage region 556a is fitted over the cylindrical support 332a.

Figure 17A:
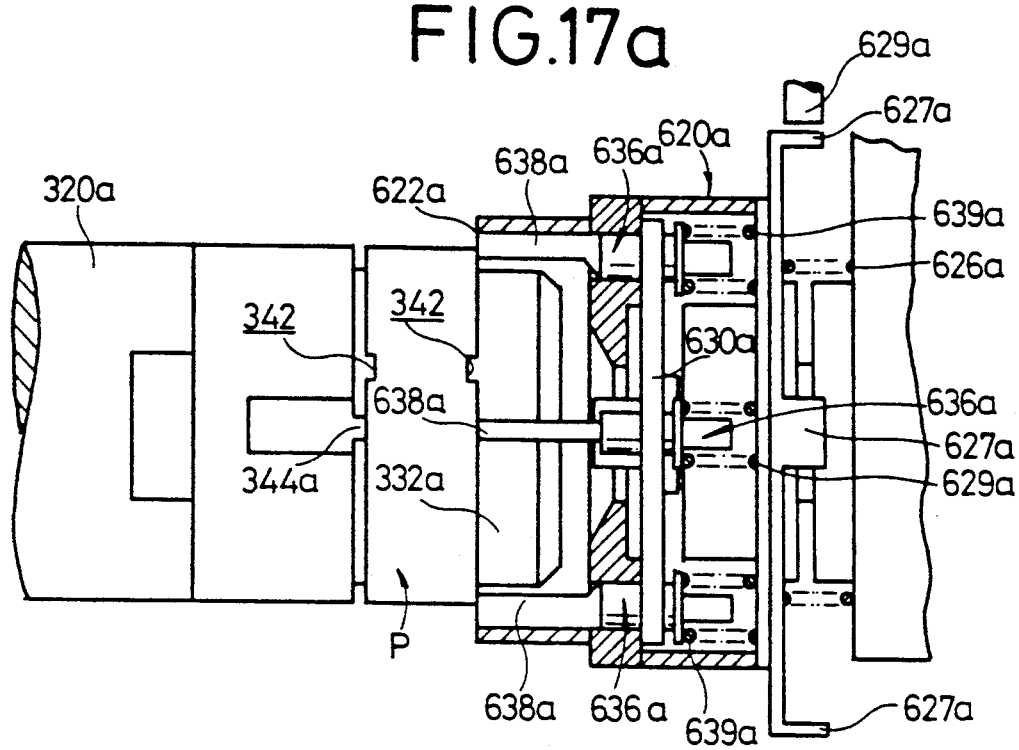

The shifting cylinder 532 is inactivated, and the cylinder 640a of the driver means 539a of the part delivery mechanism 590a is activated to move the piston rod 642a outwardly, thus causing the swing plate 644a to rotate the shaft 646a. The arm 648a coupled to the shaft 646a displaces the lever 650a on the lower end thereof toward the presser rod 320a. Therefore, the rotatable shaft 610a is moved, in unison with the engaging member 616a engaged by the lever 560a, toward the presser rod 320a. The end surface 622a of the part presser 620a fixed to the rotatable shaft 610a pushes the corresponding end of the part P, and at the same time the pins 636a press the end surface of the part P under the bias of the springs 639a engaging the inner wall of the part presser 620a (see FIG. 17(a)).

Figure 17B:
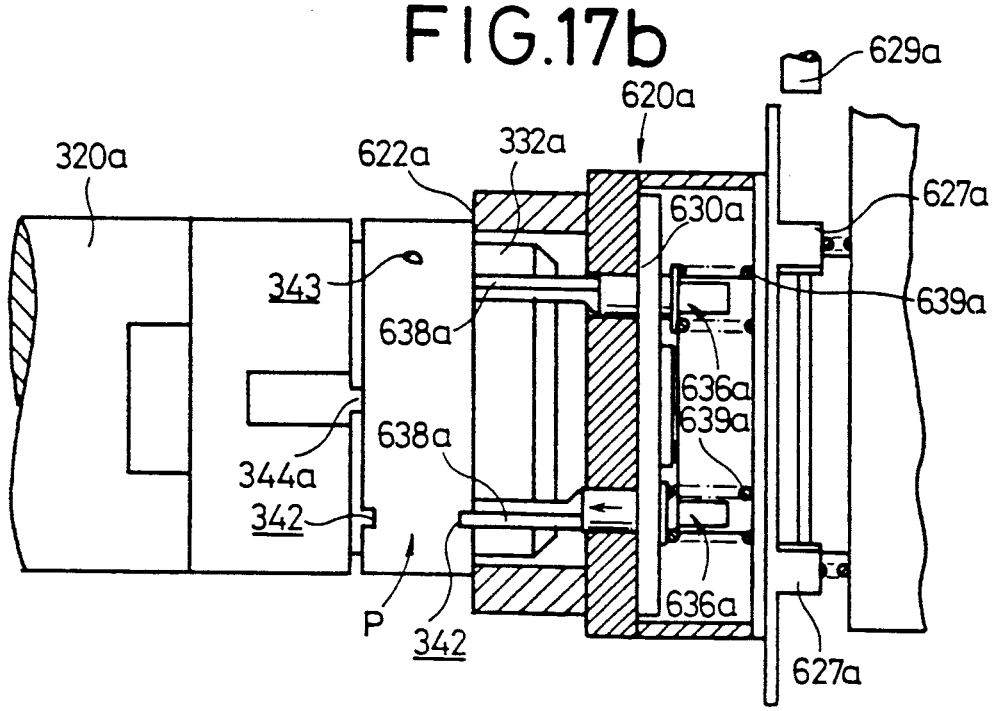

The rotative drive source 598 is now operated to rotate the pulley 600 in a given direction to cause the endless belt 602 to rotate the rotor 594a. The rotation of the rotor 594a is transmitted through the gears 596a, 606a to the clutch element 604a, whereupon the rotatable shaft 610a rotates through the splines 614a fitted in the splined hole 608a in the clutch element 604a. Therefore, the part presser 620a and the pins 636a rotate in unison. One of the pins 636a is fitted into the groove 342 in one end surface of the part P, whereupon the part P is rotated while being pressed by the pins 636a and the end surface 622a (see FIG. 17(b)). When the groove 342 in the other end surface of the part P is aligned with the positioning projection 344a on the presser rod 320a, the part P is displaced toward the presser rod 320a, and the positioning projection 344a engages into the groove 342 (see FIG. 17(c)).

At this time, the part P stops rotating, imposing a load on the pins 636a. The clutch element 604a which rotates the part presser 620a and the rotatable shaft 610a is slidably displaced toward the engaging member 616a against the resiliency of the spring 618a. The teeth 606a of the clutch element 604a are forced out of mesh with the teeth 596a of the rotor 594a, whereupon the rotation of the rotor 594a is no longer transmitted to the rotatable shaft 610a. Therefore, as shown in FIG. 17(c), any one of the dogs 627a of the first cylindrical member 621a reaches an upper position, triggering the proximity switch 629a. When the proximity switch 629a is continuously energized for a predetermined period of time, the stoppage of the part presser 620a, i.e., the positioning of the part P on the presser rod 312a, is automatically and accurately detected. Then, the rotative drive source 598 is inactivated.

After the part P has been positioned on the presser rod 320a, the cylinder 640a is actuated to angularly displace the arm 648a away from the presser rod 3320a, thereby displacing the engaging member 616a and the rotatable shaft 610a away from the presser rod 320a. Therefore, the part presser 620a and the pins 636a are released from the part P.

The shifting cylinder 532 is also operated to displace the movable base 536 toward the positioning device 200, so that the presser rod 320a is separated from the rectangular block 552a. The cylinder 540 is actuated to move the unit body 544 to the right in FIG. 13 until the unit body 544 is positioned by the positioning stopper 548b.

Figure 18A:
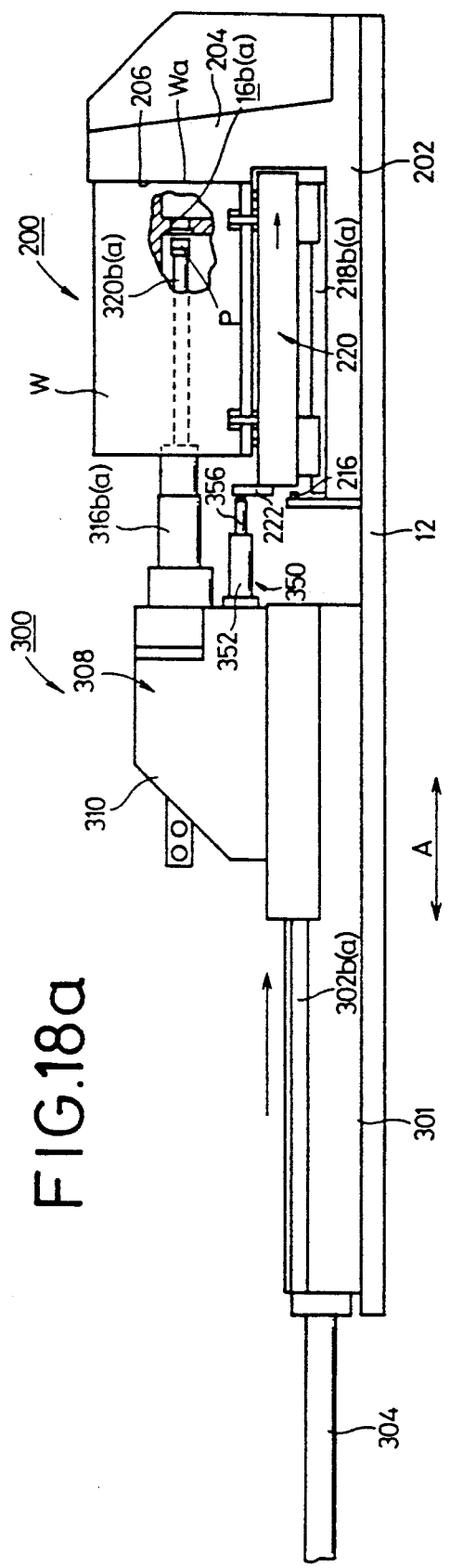
FIGS. 18(a) and 18(b) are views showing the manner in which parts are press-fitted into a workpiece by the pressing device.

The shifting cylinder 304 of the pressing device 300 is actuated to move the presser unit 308 toward the positioning device 200 along the guide rails 302a, 302b. The clamp rod 356 of the presser unit 350 first engages the bearing plate 222 fixed to the support table 220, pressing the support table 220 toward the protrusion 204 against the resiliency of the spring 214. The support table 220 is now moved toward the protrusion 204 along the guide rails 218a, 218b until the end surface Wa of the workpiece W engages the stationary reference surface 206. When the unit body 310 is further moved toward the positioning device 200 by the shifting cylinder 304, the clamp rod 356 presses the workpiece W against the stationary reference surface 206 under the bias of the spring 358 (see FIG. 18(a)).

Figure 19A:
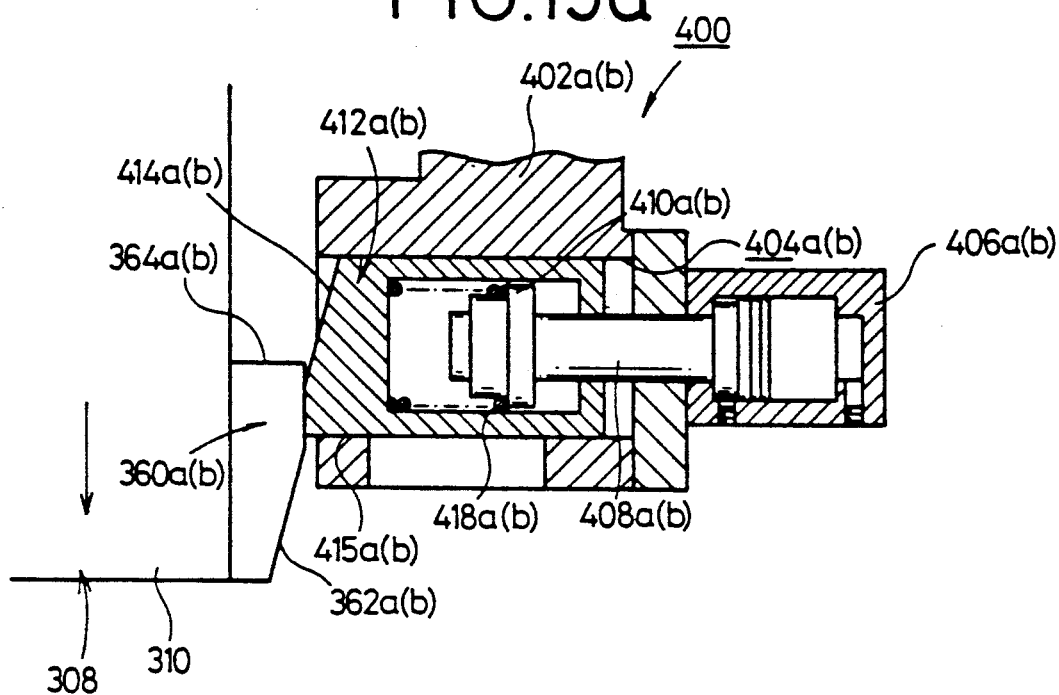

When the unit body 310 is moved toward the positioning device 200, the first locking members 360a, 360b on the opposite sides of the unit body 310 engage the respective second locking members 412a, 412b of the supporting device 400. Upon continued movement of the unit body 310 toward the positioning device 200, the second locking members 412a, 412b are pushed into the respective support columns 402a, 402b by the slanted surfaces 412a, 412b which slidingly engage the slanted surfaces 362a, 362b of the first locking members 360a, 360b. Therefore, as shown in FIG. 19(a), the second locking members 412a, 412b enter the respective openings 404a, 404b against the bias of the springs 418a, 418b. When the second locking members 412a, 412b are released from sliding engagement with the first locking members 360a, 360b, the second locking members 412a, 412b on further movement of the unit body 310, the second locking members 412a, 412b snap toward the unit body 310 under the resilient forces of the springs 418a, 418b. The locking surfaces 415a, 415b of the second locking members 412a, 412b are now held in locking engagement with the locking surfaces 364a, 364b of the first locking members 360a, 360b (see FIG. 19(b)). The shifting cylinder 304 is now inactivated.

Then, the pressing cylinder 312a is operated to displace the piston rod 314a toward the presser rod 320a. The distal end of the piston rod 314a is first brought into engagement with the intermediary presser 318a, which is displaced toward the presser rod 320a against the resiliency of the spring 322a. The presser rod 320a with the smaller-diameter portion 326a fitted in the stepped hole 324a in the intermediary presser 318a, is displaced toward the workpiece W under the bias of the spring 328a, holding the part P on the support 332a in front of the hole 16a in the workpiece W. At this time, air under pressure is introduced into the passageway 330a in the pressure rod 320a through the pipe 331a which is connected to one end of the passageway 330a. The supplied air under pressure is supplied into the four outlet passages 336a in the support 332a and then discharged radially outwardly from the outer circumference of the support 332a. Therefore, the part P is pressed against the flange 340a under the air pressure, and hence reliably retained on the support 332a.

Figure 18B:
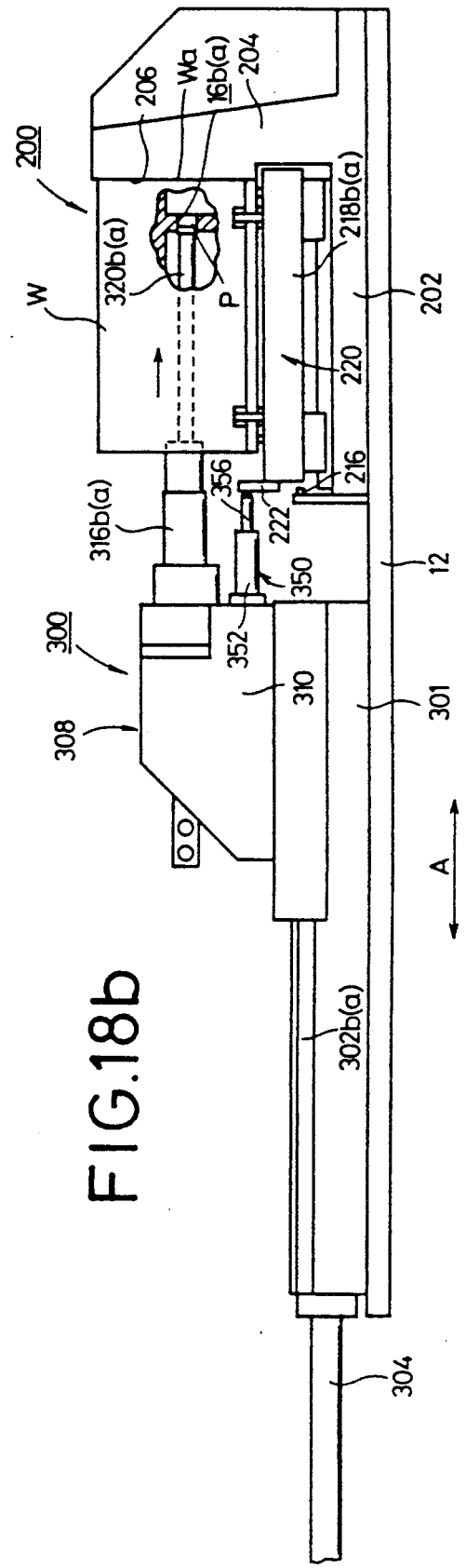

The piston rod 314a is further displaced toward the workpiece W by the pressing cylinder 312a, thus enabling the intermediary presser 318a to push the presser rod 320a toward the workpiece W thereby to press-fit the part P into the hole 16a of the workpiece W (see FIG. 18(b)). The piston rod 346a of the pressing cylinder 312a is displaced, and the dogs 347a on the piston rods 346a trigger the position sensors 348a. Therefore, the press-fitting of the part P into the hole 16a is detected.

After completion of the press-fitting of the part P into the hole 16a, the pressing cylinder 312a is actuated to retract the piston rod 314a. The intermediary presser 318a is displaced toward the piston rod 314a under the bias of the springs 328a, 322a, and the presser rod 320a is displaced toward the piston rod 314a in engagement with the intermediary presser 318a. Consequently, the support 332a on the distal end of the presser rod 320a is released from the workpiece W.

After the part P has been press-fitted in the hole 16a in the workpiece W, the pressing cylinder 312b is operated to move the presser rod 320b toward the workpiece W to press-fit the part P held on the support 332b on the presser rod 320b into the other hole 16b in the workpiece W.

After the parts P have been press-fitted respectively in the holes 16a, 16b in the workpiece W, the supporting device 400 is actuated to release the presser unit 308. More specifically, the cylinders 406a, 406b on the support columns 402a, 402b are operated to displace the piston rods 408a, 408b away from the unit body 310. The second locking members 412a, 412b engaging the spring seats 410a, 410b of the piston rods 408a, 408b are retracted into the respective openings 404a, 404b until the locking surfaces 415a, 415b are disengaged from the locking surfaces 364a, 364b of the first locking members 360a, 360b (see FIG. 19(c)). Then, the shifting cylinder 304 is activated to shift the unit body 310 along the guide rails 302a, 302b away from the positioning device 200 into a given standby position.

The feed device 100 is operated to enable the gripper mechanism 122 to grip the workpiece W with the parts P press-fitted therein. The cylinders 230 of the clamp units 228 are operated to lower the piston rods 232 for thereby causing the links 236 to release the clamp arms 234 from the workpiece W. Thereafter, the rotative drive source 116 is actuated to elevate the rod 114 to lift the gripper mechanism 122, after which the rotative drive source 112 is energized to feed the workpiece W to a next processing station. Then, a new workpiece W is placed on the support table 220 of the positioning device 200.

With the foregoing embodiment, the parts P supplied down the chute 514 are positioned and held in the respective storage regions 556a, 556b of the part positioning mechanisms 550a, 550b by the feed mechanism 508, and the distal ends of the presser rods 320a, 320b are disposed closely to the storage regions 556a, 556b. After the parts P have been press-fitted into the workpiece W and the presser unit 308 have moved to the given retracted position, the parts holder unit 531 of the parts supply device 500 is moved in the directions indicated by the arrows B, A by the cylinders 540, 532, so that the parts P can quickly be placed on the respective presser rods 320a, 320b. The process of supplying the parts is rendered more efficient than with the conventional system in which the press-fitting apparatus is turned and parts are supplied each time previous parts have been press-fitted into a workpiece.

The part positioning mechanism 550a for holding the part P is disposed on the unit body 544 which is movable back and forth in the direction indicated by the arrow B. After the part P has been delivered to the presser rod 320a, the part positioning mechanism 550a is moved a predetermined distance in the direction indicated by the arrow B. Therefore, the part positioning mechanism 550a does not interfere with the movement by the pressing device 300 of the presser rod 320a toward the workpiece W.

In the parts supply device 500, the two parts are positioned and held by the respective part positioning mechanisms 550a, 550b at the same time, and then simultaneously delivered to the presser rods 320a, 320b. This allows parts to be supplied very quickly. Since the parts P can simultaneously be press-fitted into the holes 16a, 16b in the workpiece W by the pressing device 300, the entire press-fitting process can be effected highly efficiently.

Since the parts supply device 500 is placed on the support columns 402a, 402b of the support device 400, the automatic parts press-fitting system 10 is small in size.

Moreover, the part P has the positioning grooves 342 in certain relative positional relationship to the oil hole 343, and the positioning projection 344a of the presser rod 320a engages in one of the positioning grooves 342 for thereby holding the part P in a fixed angular position on the presser rod 320a. Therefore, when the presser rod 320a is moved toward the workpiece W, the part P is prevented from being angularly moved on the presser rod 320a, and hence can be press-fitted into the workpiece W in an accurate angular position at all times. Even if the part P as it is being press-fitted into the workpiece W is subjected to different local resistances, the part P remains stably in its desired angular position and hence the oil hole 343 does not accidentally move out of communication with a corresponding oil hole in the workpiece W. Accordingly, the part P can be efficiently and highly accurately press-fitted into the workpiece W.

Furthermore, the part P is pressed toward the presser rod 320a by the part presser 620a operated by the driver means 639a, while at the same time the part P is being rotated through the pins 636a by the rotative drive means 597. Thus, when one of the positioning grooves 342 of the part P is aligned with the positioning projection 344a of the presser rod 320a, the part P is shifted toward the presser rod 320a, bringing the positioning projection 344a into the positioning groove 342. As a consequence, the part P can automatically be positioned with respect to the presser rod 320a with high accuracy, with the result that the part P can smoothly be press-fitted into the workpiece W.

When the workpiece W is placed on the support table 220 by the feed device 100, the support table 220 is held against the stopper bolt 216 by the pusher rod 210 of the pusher unit 208, creating a gap between the end surface Wa of the workpiece W and the stationary reference surface 206. At the time the workpiece W is brought down onto or up away from the support table 220, the workpiece W does not physically interfere with the stationary reference surface 206.

When the shifting cylinder 304 is activated to displace the presser unit 308 toward the positioning device 200, the clamp rod 356 of the presser unit 350 first engages the bearing pate 222 to push the support table 220 toward the protrusion 204. Therefore, the end surface Wa of the workpiece W is resiliently held against the stationary reference surface 206 under resilient forces from the spring 358 acting on the clamp rod 356. The workpiece W is now accurately and firmly positioned by the stationary reference surface 206. Upon actuation of the pressing cylinder 312a, the part P held on the distal end of the presser rod 320a can now be accurately press-fitted into the hole 16a in the workpiece W.

The workpiece W is held in position by the clamp units 228, the reference seats 224, and the positioning pins 226 on the support table 220, and the upper surface of the workpiece W is resiliently pressed down by the holders 144a, 144b of the gripper mechanism 122. When the parts P are press-fitted into the workpiece W, therefore, the workpiece W is prevented from being undesirably displaced.

As a result, the parts P can highly accurately and efficiently be press-fitted into the holes 16a, 16b in the workpiece W while the holes 16a, 16b and the presser rods 320a, 320b are being kept in coaxial alignment with each other.

The shifting cylinder 304, serving as a first actuator, is provided to move the unit body 310 toward and away from the positioning device 200, and the pressing cylinders 312a, 312b, serving as a second actuator, are provided to displace the presser rods 320a, 320b for press-fitting the parts P into the workpiece W.

Therefore, when the unit body 310 is moved back and forth, it can be moved at relatively high speed by the shifting cylinder 304. The unit body 310 is first displaced from the retracted position toward the positioning device 200, and the presser rods 320a, 320b are moved forwardly to press-fit the parts P into the workpiece W, after which the unit body 310 is moved back into the retracted position. Such a sequence of movements of the unit body 310 is therefore carried out within a short period of time. Since the presser rods 320a, 320b are required to be displaced relatively slowly when the parts P are to be press-fitted into the workpiece W, it would take a considerable length of time to move the presser unit back and forth with the conventional system in which the presser unit and the parts would be moved by one cylinder.

The pressing device 300 is arranged such that the pressing cylinders 312a, 312b are disposed coaxially with the presser rods 320a, 320b, respectively, and the presser rods 320a, 320b can alternately be actuated. Accordingly, when the parts P are press-fitted into the holes 16a, 16b in the workpiece W under high pressure, the presser rods 320a, 320b may alternately be actuated to avoid the application of an undue load to the workpiece W, thereby preventing the workpiece W from being elastically deformed or otherwise damaged. As the pressing cylinders 312a, 312b and the presser rods 320a, 320b are held in coaxial alignment with each other, the pressing forces can efficiently be exerted to the presser rods 320a, 320b, so that the pressing cylinders 312a, 312b are prevented from being unduly sturdy and large in size.

The intermediary pressers 318a, 318b are interposed between the piston rods 314a, 314b extending from the pressing cylinders 312a, 312b and the presser rods 320a, 320b. With this arrangement, when the parts P are to be positioned in front of the holes 16a, 16b in the workpiece W, the parts P can reliably be held in facing relationship to the respective holes 16a, 16b under the bias of the springs 328a, 328b, and are presented from being improperly press-fitted into these holes 16a, 16b.

If the holes 16a, 16b in the workpiece W are positioned differently in the direction indicated by the arrow A, then the dogs 347a, 347b on the piston rods 346a, 346b and the position sensors 348a, 348b may also be differently positioned to cope with such particular hole positions.

In addition, when the presser unit 308 is shifted toward the positioning device 200 and then stopped by the shifting cylinder 304, the unit body 310 is firmly held in position by the support device 400 through the first locking members 360a, 360b on the opposite sides of the unit body 310. Therefore, at the time of displacing the presser rods 320a, 320b toward the workpiece W to press-fit the parts P into the respective holes 16a, 16b in response to operation of the pressing cylinders 312a, 312b, the unit body 310 is not forcibly moved accidentally away from the positioning device 200 even if large forces are imposed to press-fit the parts P into the holes 16a, 16b.

Figure 19B:
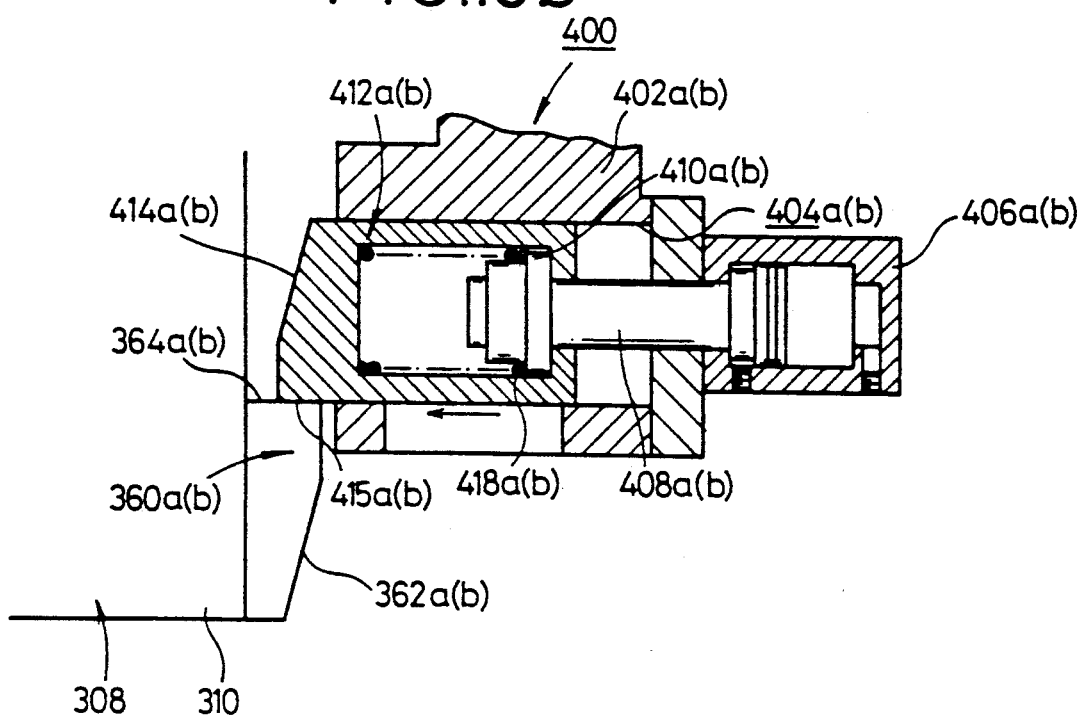

More specifically, when the unit body 310 is in its fully advanced position, as shown in FIGS. 10 and 19(b), the locking surfaces 364a, 364b of the first locking members 360a, 360b and the locking surfaces 415a, 415b of the second locking members 412a, 412b of the support device 400 are held in locking engagement with each other. When the pressing cylinder 312a, for example, is actuated to displace the presser rod 320a toward the workpiece W thereby press-fitting the part P into the hole 16a in the workpiece W under a certain pressure, the unit body 310 is subjected to a reactive force tending to move itself away from the positioning device 20. However, since the unit body 310 is securely retained by the support device 400, as described above, the unit body 310 is prevented from moving away from the positioning device 200.

Accordingly, the pressing force of the pressing cylinder 312a is not reduced, but the part P can be highly efficiently press-fitted into the hole 16a in the workpiece W. No special actuator is required to bear the reactive force acting on the unit body 310, but such reactive force can be borne by the firm locking engagement between the first locking members 360a, 360b and the second locking members 412a, 412b. As a result, the structure for bearing the reactive forces is quite simple. Inasmuch as the pressures created by the pressing cylinders 312a, 312b are effectively utilized, the pressing cylinders 312a, 312b may be relatively small in size.

The first locking members 360a, 360b have the slanted surfaces 362a, 362b and the second locking members 412a, 412b have the slanted surfaces 414a, 414b for coaction with the slanted surfaces 362a, 362b. When the unit body 310 is moved toward the positioning device 200, the second locking members 412a, 412b are shifted toward the support columns 402a, 402b by sliding engagement between the slanted surfaces 362a, 362b and 414a, 414b, after which the locking surfaces 364a, 364b and 415a, 415b are brought into locking engagement with each other. Therefore, the cylinders 406a, 406b may be actuated only when the unit body 310 is to be moved away from the positioning device 200 after the parts P have been press-fitted into the workpiece W. Consequently, the support device 400 can simply be controlled.

With the present invention, as described above, when the workpiece is placed on the movable table, a certain gap is created between the positioning end surface of the workpiece and the stationary reference surface of the jig base. Therefore, the workpiece is prevented from physical interference with the stationary reference surface at the time of placing and lifting the workpiece onto and away from the movable table.

Upon displacement of the presser unit toward the workpiece, the workpiece is first pressed against the stationary reference surface by the presser unit, and then the parts such as bearings are press-fitted into the workpiece. It is thus possible to position the workpiece firmly and reliably with respect to the stationary reference surface, and hence to press-fit the parts accurately into the workpiece. As a result, the process of press-fitting the parts into the workpiece can efficiently and accurately be performed.

Furthermore, the first actuator is provided for displacing the presser unit and the second actuator is used to displace the presser rods for press-fitting the parts into the workpiece. This two-actuator arrangement allows the presser unit to be displaced back and forth quickly, making the press-fitting process highly efficient. Even if relatively large forces for press-fitting the parts are required, the actuators are not required to be large in size, and the workpiece is prevented from being subjected to an undue load.

After the presser unit has been displaced toward the workpiece, the presser unit is firmly held in position by the support device against unwanted displacement under reactive forces which are imposed on the presser unit when the parts are press-fitted into the workpiece. Therefore, when the parts are press-fitted into the workpiece under relatively intensive forces, no appreciable reduction in the pressing forces is caused, and the parts can be press-fitted into the workpiece efficiently and reliably. The support device itself is simple in structure, holding down the cost of the entire system.

The parts are supplied to the pressing device at a position between the workpiece and the pressing device. The process of supplying the parts to the pressing device can be effected easily and quickly. With the parts supply device between the workpiece and the pressing device, the space occupied by the entire system is reduced. Since the parts supply device can supply a plurality of parts simultaneously to the pressing device, the parts supplying process is rendered efficient.

The parts can efficiently and reliably be delivered in a certain angular position to the presser rods by the driver means and the rotative drive means, with the result that the parts can be press-fitted with high accuracy.

The parts are locked in a certain angular position on the presser rods when the positioning projections on the presser rods are fitted in the positioning grooves of the parts. Therefore, when the presser rods are moved toward the workpiece, the parts are prevented from turning relatively to the presser rods. Consequently, the parts are automatically and accurately press-fitted into the workpiece while the parts are being held in the given angular position.

Although a certain preferred embodiment has been shown and described, it should be understood that many changes and modifications may be made therein without departing from the scope of the appended claims.

What is claimed is:

1. A system for press-fitting a part into a workpiece, comprising:
    a positioning device for positioning a workpiece; and
    a pressing device for press-fitting a part into the workpiece which is positioned by said positioning device;
    said positioning device comprising:
        a jig base having a stationary reference surface;
        a movable table movable toward and away from said stationary reference surface; and
        pushing means for pushing said movable table to create a gap between an end surface of the workpiece and said stationary reference surface when the workpiece is placed on said movable table;
    said pressing device comprising:
        a presser unit including a presser rod for holding the part thereon said presser unit being movable toward and away from said movable base; and
        presser means for pressing the end surface of the workpiece against said stationary reference surface to position the workpiece before the part is press-fitted into the workpiece by said presser rod.

2. A system according to claim 1, wherein said pushing means comprises:
    a resilient element; and
    a pusher rod engaging said resilient element, for resiliently pushing said movable table to create said gap between the end surface of the workpiece and said stationary reference surface.

3. A system according to claim 1, wherein said pushing means comprises:
    a resilient, element; and
    a clamp rod engaging said resilient element, for resiliently pushing either the workpiece or said movable table to press the end surface of the workpiece against said stationary reference surface, thereby positioning the workpiece.

4. A system according to claim 1, further comprising clamping means for holding the workpiece on said movable table.

5. A system according to claim 1, further comprising a feed device having gripping means for placing and removing the workpiece on and from said movable table.

6. A system according to claim 5, wherein said gripping means comprises:
    an actuator;
    at least a pair of arms movable toward and away from each other by said actuator; and
    a holder for resiliently holding the workpiece under pressure when the part is press-fitted into the workpiece.

7. A system according to claim 1, further comprising a support device for supporting said presser unit against movement away from the workpiece when the part is press-fitted into the workpiece by said presser rod.

8. The system according to claim 1, wherein said pressing device further comprises:
    a first actuator, wherein said presser unit is movable toward and away from: the workpiece by said first actuator; and
    a second actuator mounted on said presser unit coaxially with said presser rod, wherein said presser rod is operable by said second actuator for press-fitting the part into the workpiece.

9. The system according to claim 8, and further including a third actuator and an additional presser rod, the arrangement being such that said second and third actuators are successively operated to press-fit parts held respectively on said presser rods alternately into the workpiece.

10. The system according to claim 9, wherein said second and third actuators each comprise a cylinder having a piston rod extending therefrom, and further including an intermediary presser engaging a resilient element and disposed coaxially between said piston rod and said presser rod.

11. The system according to claim 8, wherein said second actuator comprises a cylinder having a piston rod extending therefrom, and further including an intermediary presser engaging a resilient element and disposed coaxially between said piston rod and said presser rod.

12. The system according to claim 1, and further comprising a support device engageable with said presser unit, for supporting said presser unit against movement away from the workpiece when the part is press-fitted into the workpiece.

13. The system according to claim 12, wherein said presser unit has a first locking member, and said support device has an actuator and a second locking member movable into and out of locking engagement with said first locking member in response to operation of said actuator.

14. The system according to claim 12, wherein said first locking member is disposed on at least one side surface of the presser unit, said second locking member being movable in a direction transverse to the direction in which said presser unit is movable, said support device further including a resilient element for biasing said second locking member in locking engagement with said first locking member to hold said presser unit.

15. The system according to claim 14, wherein said first and second locking members include slanted surfaces, respectively, the arrangement being such that when said presser unit is moved toward the workpiece, said second locking member is displaced away from said presser unit by sliding engagement between said slanted surfaces, and thereafter said first and second locking members are brought into locking engagement with each other, so that said presser unit is held by said support device.

16. The system according to claim 1, and further comprising a parts supply device for supplying the part to said presser rod, said parts supply device comprising:
   a feed mechanism for feeding a part; and
   a holder unit disposed between said presser rod and the workpiece, said holder unit being movable back and forth in a direction transverse to the direction in which the part is press-fitted into the workpiece, for holding a part fed by said feed mechanism, said holder unit being also movable back and forth in said direction in which the part is press-fitted into the workpiece, for placing the part on said presser rod.

17. The system according to claim 16, wherein said feed mechanism comprises means for intermittently feeding at least two parts at a time, said holder unit having two storage regions for storing and positioning the parts fed by said feed mechanism.

18. The system according to claim 17, and further including an additional presser rod for press-fitting a part into the workpiece, said holder unit comprising part positioning mechanism for positioning the parts in said storage regions, respectively, said part positioning mechanisms being movable away from the parts in said storage regions when the parts are placed on the presser rods, respectively.

19. The system according to claim 17, and further comprising a part delivery mechanism for rotating the part and positioning the part in a given angular position on said presser rod when the part is placed on said presser rod.

20. The system according to claim 19, wherein said rotative drive means comprises:
   a rotor;
   a clutch element engageable with said rotor; and
   a rotatable shaft on which said presser is coaxially mounted, said rotatable shaft being axially movable and rotatable with said clutch element.

21. A system according to claim 19, wherein said driver means comprises an actuator for displacing said rotatable shaft toward and away from said presser rod.

22. The system according to claim 16, and further comprising a part delivery mechanism for rotating the part and positioning the part in a given angular position on said presser rod when the part is placed on said presser rod.

23. The system according to claim 1, further comprising a parts supply device for supply the part to said presser rod, said parts supply device comprising:
   a holder unit having a storage region for holding the part with a positioning groove thereof being oriented toward said presser rod, said holder unit being movable toward and away from an axial direction of said presser unit; and
   a part delivery mechanism mounted on said holder unit, for delivering the part to said presser rod, said part delivery mechanism comprising:
   a presser disposed coaxially with said storage region;
   driver means for driving said presser to press the part out of said storage region toward said presser rod; and
   rotative drive means for rotating the part through said presser until a positioning projection on said presser rod is fitted into a positioning groove in the part.

24. The system according to claim 23, wherein said presser comprises:
   a rotor;
   a clutch element engageable with said rotor; and
   a rotatable shaft on which said presser is coaxially mounted, said rotatable shaft being axially movable and rotatable with said clutch element.

25. The system according to claim 19, wherein said presser comprises:
   at least one pin movable back and forth and fittable in a second positioning groove defined in one side of the part, said pin being rotatable by said rotative drive means to rotate the part until said positioning projection on said presser rod is fitted into said first-mentioned groove defined in another side of the part; and
   a resilient element engaging said pin.

26. A system according to claim 25, and further comprising at least one dog disposed on said presser and a sensor energizable by said dog, the arrangement being such that said positioning projection of said presser rod is detected as being fitted in the positioning groove in said part when said sensor is continuously energized by said dog for a predetermined period of time.

* * * * *

UNITED STATES PATENT AND TRADEMARK OFFICE
CERTIFICATE OF CORRECTION

PATENT NO. : 5,067,231

DATED : November 26, 1991

INVENTOR(S) : Tsugio Ueno, Masato Sato, and Yoshiaki Mori

It is certified that error appears in the above-identified patent and that said Letters Patent is hereby corrected as shown below:

In the Drawings, Figure 11, the unidentified arrow should be identified as -- A --.

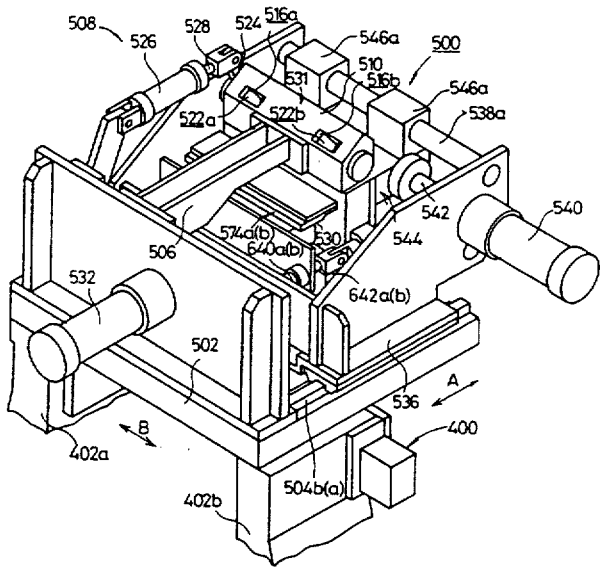

FIG.11

UNITED STATES PATENT AND TRADEMARK OFFICE
CERTIFICATE OF CORRECTION

PATENT NO. : 5,067,231

DATED : November 26, 1991

INVENTOR(S) : Tsugio Ueno, Masato Sato, and Yoshiaki Mori

It is certified that error appears in the above-identified patent and that said Letters Patent is hereby corrected as shown below:

In the Drawings, Figure 13, the lead line to a guide bar indicated by reference numeral 531 should be changed to an arrow pointing generally.

Figure 13, the member originally identified with numeral "531" should be identified with numeral -- 538a --.

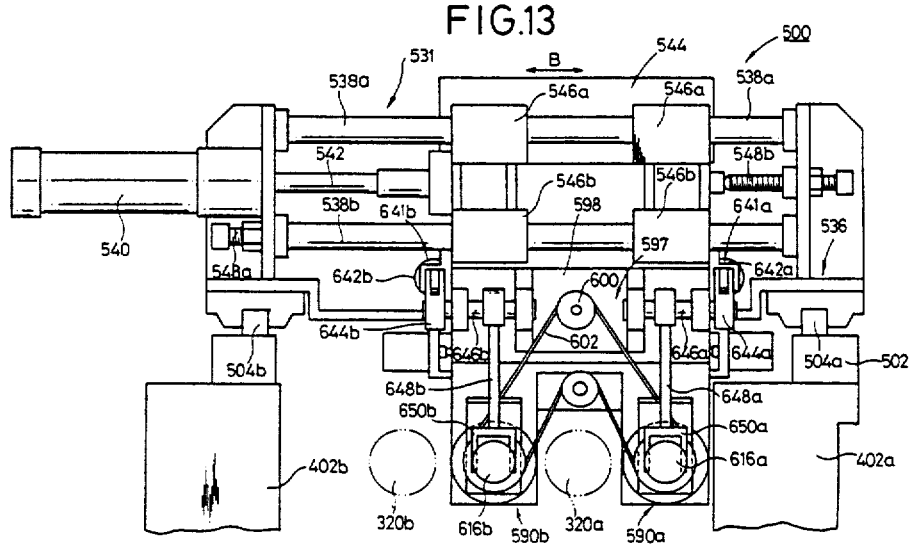

UNITED STATES PATENT AND TRADEMARK OFFICE
CERTIFICATE OF CORRECTION

PATENT NO. : 5,067,231

DATED : November 26, 1991

INVENTOR(S) : Tsugio Ueno, Masato Sato, and Yoshiaki Mori

It is certified that error appears in the above-indentified patent and that said Letters Patent is hereby corrected as shown below:

```
Column 6, line 32, change "front" to -- rear --

Column 10, line 68, change "arrow B" to
-- arrows A and B --

Column 13, line 32, change "122" to -- 112 -- line 32, change "inactivated" to
-- deactivated --

Column 14, line 45, change "inactivated" to
-- deactivated --
Column 21:
Claim 1, line 18, change "said movable base" to
-- said movable table --
Column 22:
Claim 14, line 1, change "12" to -- 13 --
Column 23:
Claim 20, line 1, change "19" to -- 25 --
Column 23:
Claim 21, line 1, change "19" to -- 20 --
```

UNITED STATES PATENT AND TRADEMARK OFFICE
CERTIFICATE OF CORRECTION

PATENT NO. : 5,067,231

DATED : November 26, 1991

INVENTOR(S) : Tsugio Ueno, Masato Sato, and Yoshiaki Mori

It is certified that error appears in the above-identified patent and that said Letters Patent is hereby corrected as shown below:

```
Column 23:
Claim 23, lines 7 and 8, change "toward and away
from an axial direction of said presser unit" to
-- in the axial direction of said presser rod --
Column 24:
Claim 25, line 1, change "19" to -- 23 --
Column 24:
Claim 26, line 1, change "25" to -- 24 --
```

Signed and Sealed this

Third Day of January, 1995

*Attest:*

BRUCE LEHMAN

*Attesting Officer*        *Commissioner of Patents and Trademarks*